(12) United States Patent
Baird et al.

(10) Patent No.: US 11,101,480 B2
(45) Date of Patent: Aug. 24, 2021

(54) FUEL CELL UNITS HAVING ANGLED OFFSET FLOW CHANNELS

(71) Applicant: Intelligent Energy Limited, Loughborough (GB)

(72) Inventors: Scott Baird, Loughborough (GB); Jonathan Cole, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 10 days.

(21) Appl. No.: 16/637,939

(22) PCT Filed: Aug. 3, 2018

(86) PCT No.: PCT/GB2018/052225
§ 371 (c)(1),
(2) Date: Feb. 10, 2020

(87) PCT Pub. No.: WO2019/030505
PCT Pub. Date: Feb. 14, 2019

(65) Prior Publication Data
US 2020/0212470 A1  Jul. 2, 2020

(30) Foreign Application Priority Data
Aug. 11, 2017  (GB) .................................. 1712954

(51) Int. Cl.
| | | |
|---|---|---|
| *H01M 8/1006* | (2016.01) | |
| *H01M 8/2483* | (2016.01) | |
| *H01M 8/0276* | (2016.01) | |
| *H01M 8/04089* | (2016.01) | |
| *H01M 8/2485* | (2016.01) | |

(52) U.S. Cl.
CPC ....... *H01M 8/1006* (2013.01); *H01M 8/0276* (2013.01); *H01M 8/04089* (2013.01); *H01M 8/2483* (2016.02); *H01M 8/2485* (2013.01)

(58) Field of Classification Search
CPC ................................................. H01M 8/1006
See application file for complete search history.

(56) References Cited

U.S. PATENT DOCUMENTS

| | | | | |
|---|---|---|---|---|
| 4,344,832 A | * | 8/1982 | Dahlberg ............ | H01M 8/2415 204/258 |
| 5,312,700 A | * | 5/1994 | Ishida ................. | H01M 8/2432 429/481 |
| 6,040,076 A | | 3/2000 | Reeder | |

(Continued)

OTHER PUBLICATIONS

International Patent Application No. PCT/GB2018/052225; Int'l Preliminary Report on Patentability; dated Feb. 20, 2020; 9 pages.

(Continued)

*Primary Examiner* — Brian R Ohara
(74) *Attorney, Agent, or Firm* — Bakerhostetler LLP

(57) ABSTRACT

The present disclosure provides fuel cell units formed from a plurality of flow plate assemblies disposed in a stack configuration, with adjacent flow plate assemblies in the stack configuration disposed at an offset angle relative to each other. Fuel cell stacks can be formed from a plurality of the fuel cell units placed into a stack aligned with each other with no offset. The present disclosure also provides for methods of forming the fuel cell units, fuel cell stacks, and fuel cell systems containing the former.

24 Claims, 17 Drawing Sheets

(56) References Cited

U.S. PATENT DOCUMENTS

| | | |
|---|---|---|
| 6,261,710 B1 | 7/2001 | Marianowski |
| 2004/0224205 A1 | 11/2004 | Marianowski et al. |
| 2015/0325876 A1* | 11/2015 | Haase ................. H01M 8/0267 |
| | | 429/458 |

OTHER PUBLICATIONS

International Search Report dated Dec. 5, 2018 in PCT application No. PCT/GB2018/052225.
International Written Opinion dated Dec. 5, 2018 in PCT application No. PCT/GB2018/052225.

* cited by examiner

O. Crushable Foam model Symmetry*

Equivalent Stress 3
Type: Equivalent (Von-Mises) Stress - Top/Bottom
Unit: MPa

FUEL CELL UNITS HAVING ANGLED OFFSET FLOW CHANNELS

CROSS-REFERENCE TO RELATED APPLICATIONS

This application is a 371 National Stage Application of International Patent Application No. PCT/GB2018/052225 filed Aug. 3, 2018, which claims priority from GB Patent Application No. 1712954.5 filed Aug. 11, 2017, the entire contents of which are hereby incorporated by reference.

FIELD OF THE DISCLOSURE

This disclosure is in the field electrochemical fuel cells. In particular, the disclosure relates to devices and methods for use in electrochemical fuel cell assemblies, including fluid flow plates allowing for multiple fluid flow channels and arrangements thereof.

BACKGROUND

A fuel cell stack assembly can be formed from a series of fluid flow plates alternated with membrane electrode assembly layers. In an evaporatively cooled (EC) proton exchange membrane (PEM) fuel cell, water can be introduced via anode fluid flow paths or cathode fluid flow paths into the fuel cell stack to hydrate the membrane and to cool the cells. EC cells can provide good mass and volumetric power density because of a simple single plate arrangement and reduced cell pitch when compared to liquid-cooled fuel cells with intervening sealed liquid cooling passageways. In a typical EC fuel cell arrangement, the cooling water is injected into the anode or cathode fluid flow channels from one or more common manifolds extending down the side of the fuel cell stack. A potential problem arises from the flow rates of water, cathode fluid, and anode fluid within such manifolds. Water may be fed into an inlet at one end of the manifold from which it is fed into individual cells in the stack. Problems can occur in any regions of stagnant or near stagnant water flow due to increased corrosion risk, particularly when using deionized water, and an increased risk of buildup of bacteria. EC fuel cell stacks impart a pressure drop on the cathode and anode fluids to a similar level as that through the active area, which creates a dependency on the consistency of the cell periphery manifolds and resultant pressure drops for cell-to-cell performance consistency.

Some problems to be addressed in fuel cell assemblies include: ensuring a uniform flow field for fluid distribution in fuel, oxidant, and coolant lines; minimizing the pressure drop across inlet manifolds; minimizing the sealing pressure required to ensure gas-tight operation; making the construction of a fluid flow plate compatible with mechanized assembly processes, given the large number of units that need to be assembled with precision in manufacturing a fuel cell assembly; reducing the pitch of the fuel cells making up a stack while maintaining operation within desired parameters; reducing the number of components: reducing the overall weight; reducing material usage and wastage; simplifying the design, manufacture and assembly; and in general reducing the overall cost of a fuel cell assembly.

It is an object of the invention to address one or more of the above-mentioned problems

DISCLOSURE

In typical fuel cell stack assemblies, the individual flow plates are aligned in identical orientation in order to provide for shared inlet and outlet manifolds for the fluid flows into and out of the stack assembly. Typical arrangements have substantially parallel tracks or channels formed in the flow plates, either as channels that run across the face of the plate or as serpentine paths that alternate directions across the face of the plate. It has been observed that in such arrangements, the use of identical sets of substantially parallel tracks or channels can lead to reduced performance of the fuel cell stack. Compression across the full surface of the membrane electrode assemblies can be inconsistent due to lack of rigidity through the stack which is under mechanical compression, leading to lateral instability, buckling or curvature of flow plates in a stack. In these arrangements, the membrane electrode assemblies can deform between the channel structures and conform to and nest between the flow fields. This deformation can lead to lower mean and maximum stresses on the membrane electrode assembly, which is undesirable because the membrane electrode assemblies require a threshold amount of contact pressure to avoid pin-holing, as a result of swell/shrink cycles typically occurring in real world operation, and to provide for electrical contact. Electrical performance can be improved by providing higher and more consistent contact pressure across the surface of the membrane electrode assemblies. Further, a factor in the lifetimes of membrane electrode assemblies is the creation of stress concentrations or localized stresses. These stress concentrations can result from several sources including thinning of the membrane electrode assembly in spots due to areas of greater compression within the membrane from any rough surfaces of the gas diffusion layers or the channel design of the flow plates. Further performance problems have been observed due to the close adjacency of cooling fluid distribution features of adjacent flow plates in the stack, which can restrict the fluid flow access as the cell pitch is minimized. In some prior systems, an additional gas diffusion layer is necessary as a "gap filler" to enable effective cell height in order to provide necessary fluid flow into the cells. The use of this additional gas diffusion layer increases total component count and makes automated assembly and manufacturing approaches more problematic.

In some implementations of the disclosure, increased current density and cell-to-cell consistency can be provided by providing a stack assembly in which adjacent flow plate assemblies are oriented with an offset angle. With an offset angle provided between adjacent plate assemblies, the substantially parallel channels or tracks in adjacent plates do not directly mesh and overlap with each other, and instead intersect with a plurality of crossing points where the corrugation peaks of the substantially parallel channels of the adjacent plate assemblies intersect with each other. The offset angle arrangement can therefore reduce nesting of the MEA in between the plate assemblies and increase maximum normal stress and contact pressure on the MEA. The use of offset angles allows for the use of identical plates in adjacent plate assemblies, eliminating the need to utilize two or more different plate designs, which would require multiple separate tooling apparatuses and complicate the manufacturing process. The use of offset angles also enables increased height of the fluid passageways and can improve cell-to-cell mechanical stability during stacking and compression. This can result in improved mechanical loading and more consistent cell attitude and pitch through the stack. Further benefits can include reduced component count, as "gap filler" components can be eliminated due to the increased height of fluid passageways. Reducing the pressure drop for fluid flows through the cell periphery can enable a more consistent cell-to-cell performance and enable higher current draws.

The present disclosure provides aspects of fuel cell units comprising a plurality of flow plate assemblies disposed in a stack configuration, wherein each flow plate assembly comprises an identical flow plate and a membrane electrode assembly. Each flow plate can comprise a corrugated plate having cathode fluid flow channels on a first face of the corrugated plate and anode fluid flow channels across a second face of the corrugated plate. The cathode fluid flow channels and anode fluid flow channels can be arranged to provide fluid flow from a flow plate inlet region to a flow plate outlet region, and the flow plate can further comprise one or more pairs of side seal regions. Each membrane electrode assembly can be disposed on the first face of the corrugated plate. Each flow plate assembly can further comprise a fluid manifold periphery plate having an inlet manifold portion configured to engage with the flow plate inlet region, an outlet manifold portion configured to engage with the flow plate outlet region, and one or more pairs of pass-through manifold portions configured to engage with the one or more pairs of side seal regions. Adjacent flow plate assemblies in the fuel cell units can be disposed at an offset angle.

The present disclosure provides fuel cell stacks comprising a plurality of the fuel cell units of the disclosure. The fuel cell units can be arranged in the fuel cell stacks adjacent to each other with no offset angle. The fuel cell units within a fuel cell stack can be identical.

The present disclosure provides aspects of fuel cell systems comprising the fuel cell stacks of the disclosure. The fuel cell systems can further comprise an anode fluid supply containing anode fluid and fluidly connected to the anode inlets of the fuel cell stack, a cathode fluid supply containing cathode fluid and fluidly connected to the cathode inlets of the fuel cell stack, and a coolant fluid supply containing coolant fluid and fluidly connected to the coolant inlets of the fuel cell stack. The anode fluid can comprise a fuel, the cathode fluid can comprise an oxidant, and the coolant fluid can comprise water.

The present disclosure provides methods of forming fuel cell units, the methods comprising forming a plurality of identical flow plates, forming a plurality of fluid manifold periphery plates, forming a plurality of flow plate assemblies, with each flow plate assembly comprising one of the identical flow plates disposed on one of the fluid manifold periphery plates and a membrane electrode assembly disposed on the flow plate, and forming the fuel cell unit by assembling a plurality of the formed flow plate assemblies into a stack configuration with adjacent flow plate assemblies disposed at an offset angle.

The present disclosure provides methods of forming fuel cell stacks, the methods comprising aligning a plurality of identical fuel cell units formed according to the methods of the disclosure, with each identical fuel cell unit aligned with an adjacent fuel cell unit with no offset angle.

The present disclosure provides methods of forming fuel cell units, the methods comprising forming a fuel cell stack according to the methods of the disclosure, fluidly connecting an anode fluid supply containing anode fluid to the anode inlets of the fuel cell stack, fluidly connecting a cathode fluid supply containing cathode fluid to the cathode inlets of the fuel cell stack, and fluidly connecting a coolant fluid supply containing coolant fluid to the coolant inlets of the fuel cell stack.

The general description and the following detailed description are exemplary and explanatory only and are not restrictive of the disclosure, as defined in the appended claims. Other aspects of the present disclosure will be apparent to those skilled in the art in view of the detailed description of the disclosure as provided herein.

DRAWINGS

The summary, as well as the following detailed description, is further understood when read in conjunction with the appended drawings. For the purpose of illustrating the disclosure, there are shown in the drawings exemplary implementations of the disclosure; however, the disclosure is not limited to the specific methods, compositions, and devices disclosed. In addition, the drawings are not necessarily drawn to scale. In the drawings.

In the figures, like reference numerals designate corresponding parts throughout the different views. All descriptions and callouts in the Figures are hereby incorporated by this reference as if fully set forth herein.

FURTHER DISCLOSURE

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular exemplars by way of example only and is not intended to be limiting of the claimed disclosure. Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another exemplar includes from the one particular value and/or to the other particular value. Similarly, when values are expressed as approximations, by use of the antecedent "about." it will be understood that the particular value forms another exemplar. All ranges are inclusive and combinable.

It is to be appreciated that certain features of the disclosure which are, for clarity, described herein in the context of separate exemplar, may also be provided in combination in a single exemplary implementation. Conversely, various features of the disclosure that are, for brevity, described in the context of a single exemplary implementation, may also be provided separately or in any subcombination. Further, reference to values stated in ranges include each and every value within that range.

Figure 1:
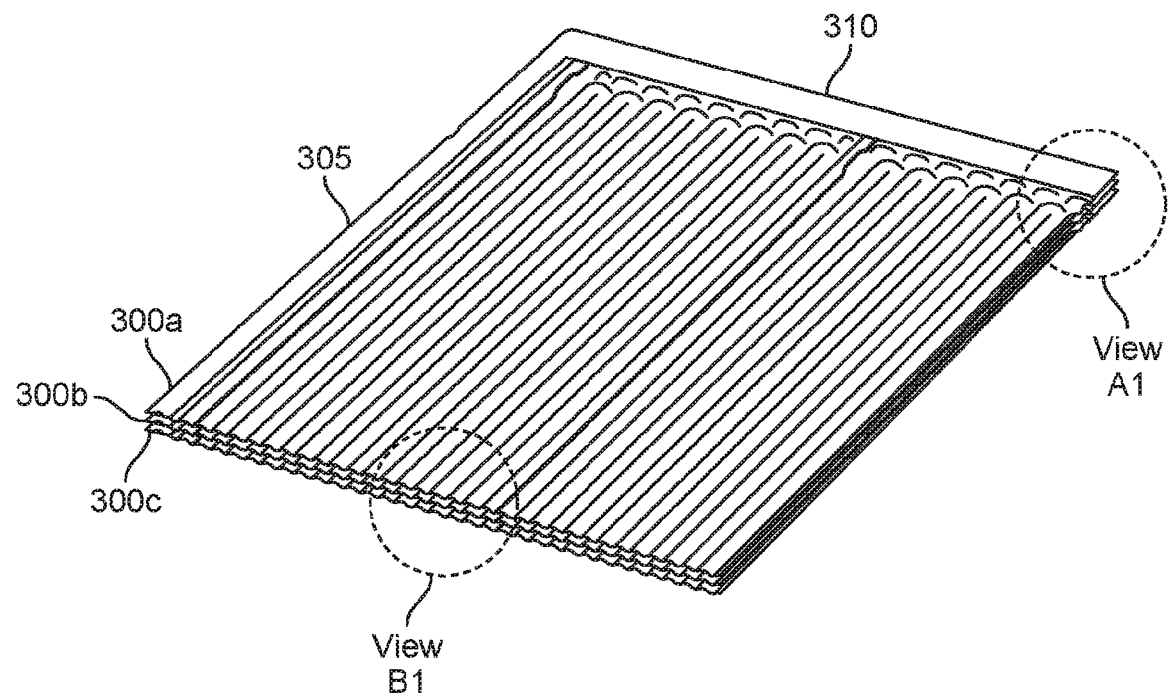
FIG. 1 illustrates aspects of an implementation of a fuel cell unit in a cut-away perspective view.
Figure 2:
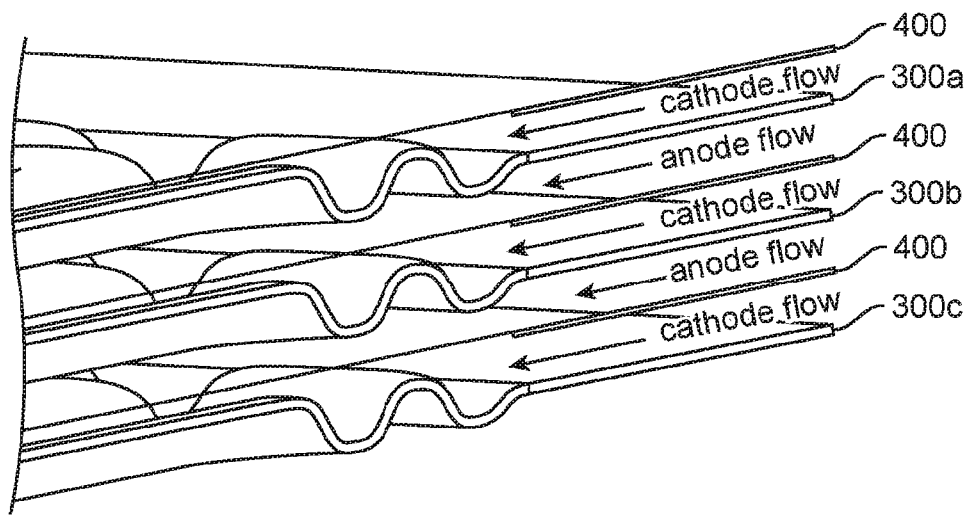
FIG. 2 illustrates aspects of the fuel cell unit of FIG. 1 as a close-up view of View A1 of FIG. 1.
Figure 3:
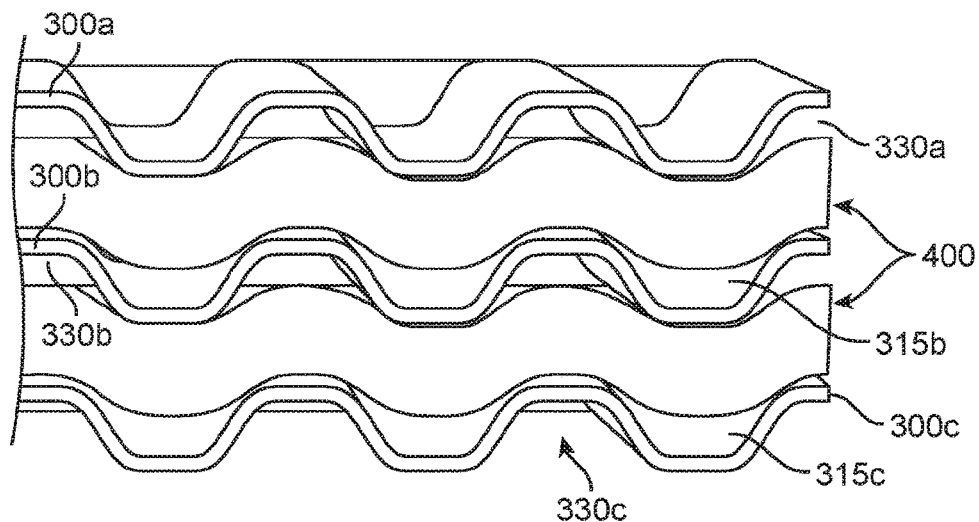
FIG. 3 illustrates aspects of the fuel cell unit of FIG. 1 as a close-up view of View B1 of FIG. 1.
Figure 4:
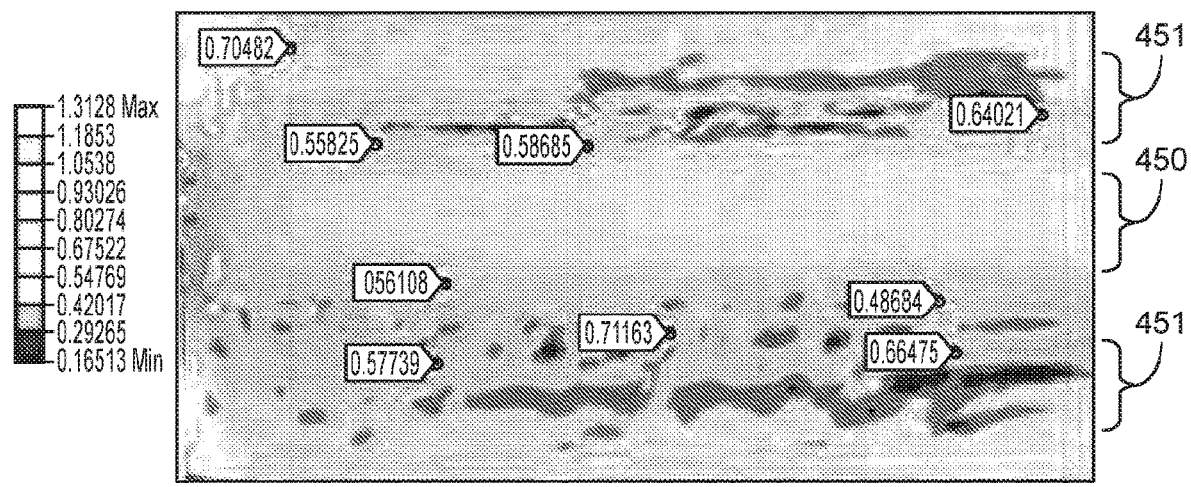
FIG. 4 illustrates results of finite element analysis modeling of the fuel cell unit of FIG. 1.
Figure 5:
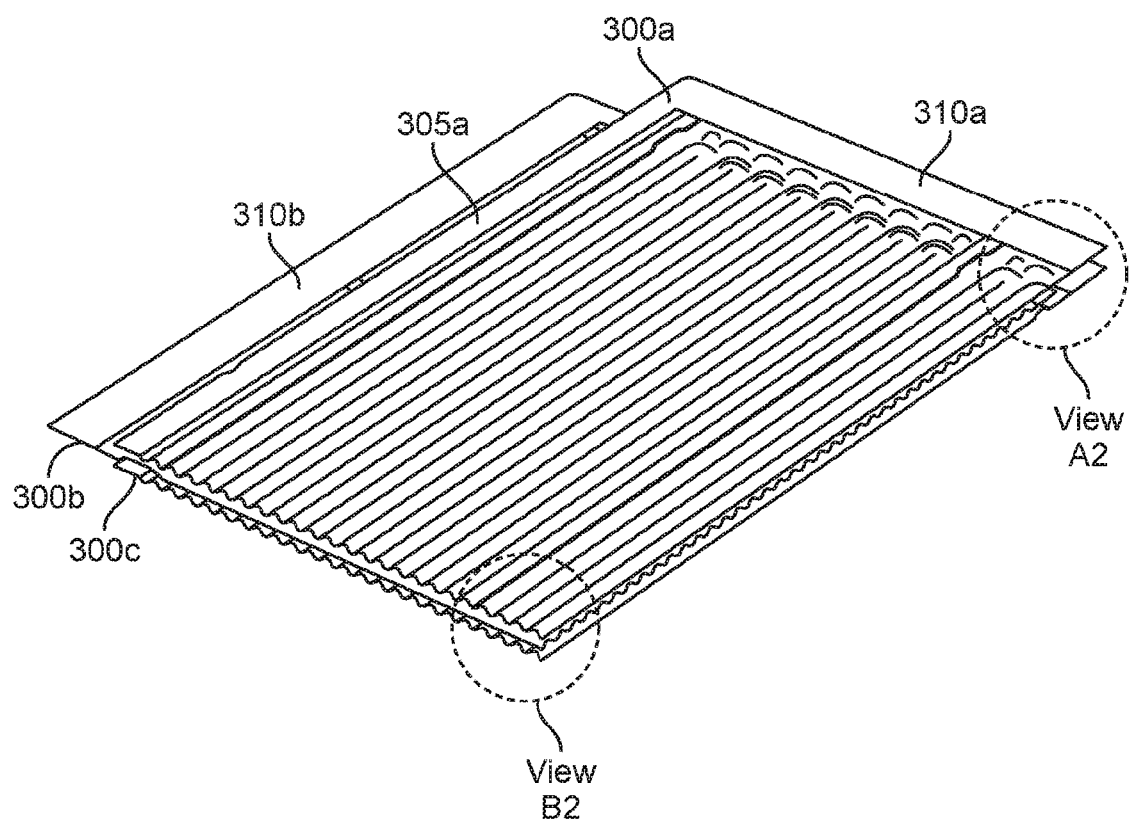
FIG. 5 illustrates aspects of an implementation of a fuel cell unit in a cut-away perspective view.
Figure 6:
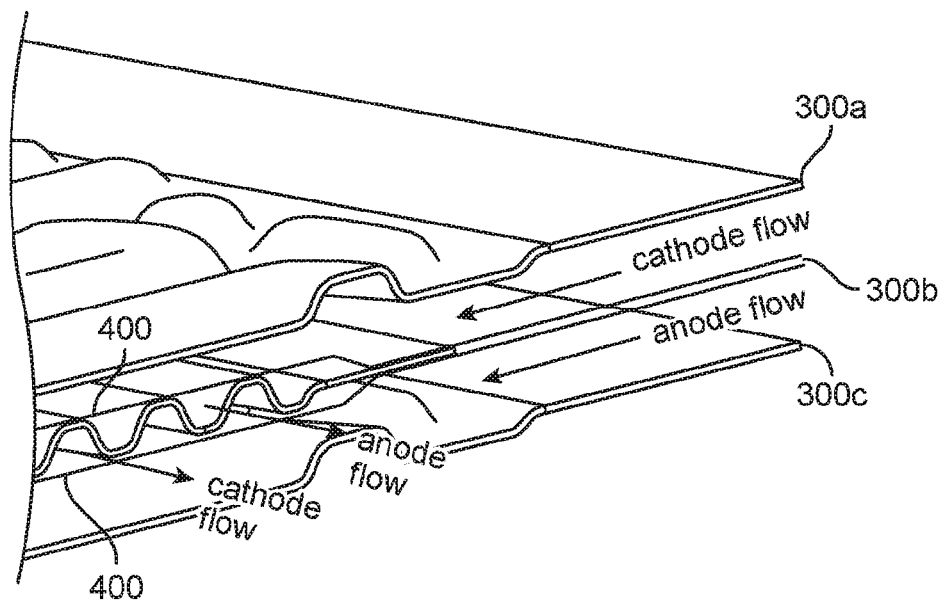
FIG. 6 illustrates aspects of the fuel cell unit of FIG. 5 as a close-up view of View A2 of FIG. 1.

FIGS. 1-3 show aspects of a fuel cell stack. Identical flow plates 300a, 300b, and 300c are stacked adjacent to each other in the same orientation, such that the flow plate inlet regions 310, flow plate side seal regions 305, and flow plate outlet regions 320 (not shown) are aligned across flow plates 300a, 300b, and 300c. Flow plates 300 are provided as corrugated plates having cathode fluid flow channels 330 on a first face of the corrugated plate and anode fluid flow channels 315 across a second face of the corrugated plate. Electrode membranes 400 (not shown in FIG. 1) are disposed between adjacent flow plates 300. As shown in FIG. 2, cathode fluid flow and anode fluid flow are provided in the fluid flow channels 315/330 on either side of the membranes 400. Fluid flow channels 315/330 can be provided as substantially parallel tracks or channels formed in the flow plates, either as channels that run across the face of the plate or as serpentine paths that alternate directions across the face of the plate between flow plate inlet region 310 and flow plate outlet region 320. Membranes 400 may be provided with one or more anode gas diffusion layers 401, one or more cathode gas diffusion layers 402, or both (not shown in FIGS. 1-3). As shown in FIG. 3, when under compression normal to the first and second faces of the flow plates 300, membranes 400 can deform and conform to the interleaving interaction of the adjacent flow plates 300a. 300b, and 300c. FIG. 4 shows finite element analysis (FEA) modeling of a membrane electrode assembly under static compression between two flow plates having parallel tracks aligned as shown in FIGS. 1-3, with parallel tracks running left-to-right in FIG. 4. As seen in FIG. 4, regions of lower normal stress 451 result on either side of regions of higher normal stress 450.

Figure 7:
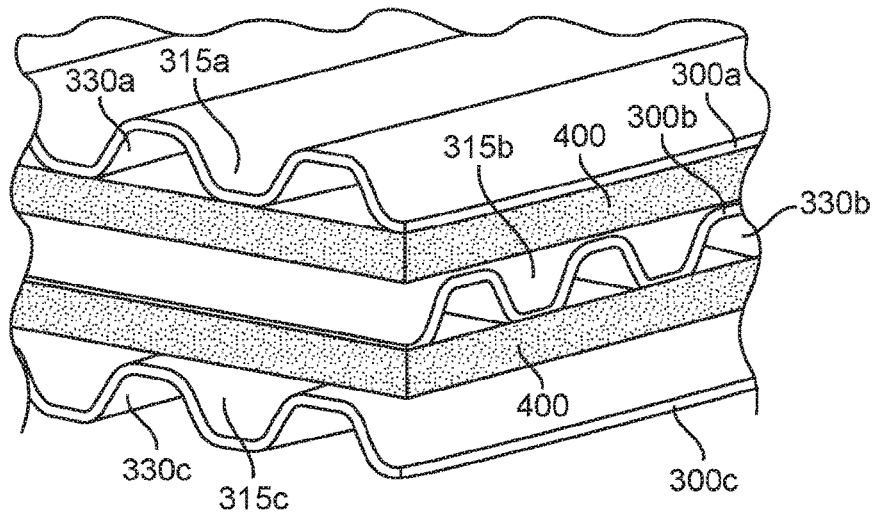
FIG. 7 illustrates aspects of the fuel cell unit of FIG. 5 as a close-up view of View B2 of FIG. 1.
Figure 8:
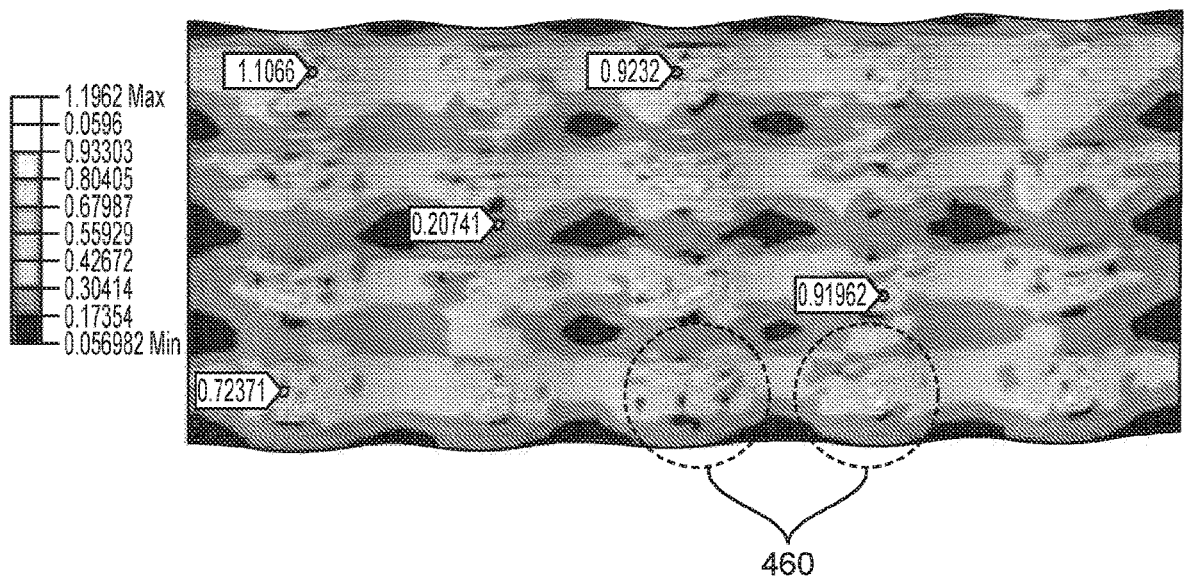
FIG. 8 illustrates results of finite element analysis modeling of the fuel cell unit of FIG. 5.

FIGS. 5-8 show aspects of an exemplary fuel cell unit of the present disclosure. Flow plates 300a. 300b, and 300c identical to those shown in FIGS. 1-4 are provided in an alternative arrangement to provide improved performance. Similarly to FIGS. 1-4, membranes 400 are disposed between adjacent flow plates 300, and may be provided with gas diffusion layers 401/402 as discussed above with reference to FIGS. 1-4. In contrast to adjacent plates are provided at an offset angle such that the cathode fluid flow and anode fluid flow across a particular membrane 400 are provided at offset angles. As seen in FIG. 7, the cathode fluid flow channels 330 and anode fluid flow channels 315 of adjacent plates run at offset angles. In the implementation shown in FIGS. 5-8, the offset angle between adjacent flow plates 300a/300b or 300b/300c is 90°, with every other flow plate, such as flow plate 300a and 300c, provided in identical orientations, i.e. with no relative offset angle. As seen schematically in FIG. 3, membranes 400 are not disposed within any interleaving interaction of the adjacent flow plates 300a. 300b, and 300c as occurs in the arrangement of FIGS. 1-4. Instead, membranes 400 are contacted at a plurality of crossing points where the crests of the corrugations in adjacent plates intersect in the plane of the flow plates. FIG. 8 shows FEA analysis modeling as in FIG. 4, but with the offset angle arrangement of the flow plates providing static compression. A plurality of higher normal stress regions 460 result, providing a higher maximum normal stress (contact pressure) on the membrane. As discussed above, the higher maximum normal stress can provide improved electrical performance of a fuel cell stack having the arrangement shown in FIGS. 5-8 in comparison to a stack having the arrangement of FIGS. 1-4.

According to some exemplary implementations, the present disclosure provides for fuel cell units having a plurality of flow plate assemblies disposed in a stack configuration. Each flow plate assembly comprises a flow plate 300, a membrane electrode assembly 400/401/402, and a fluid manifold periphery plate 200 having an inlet manifold portion 205, an outlet manifold portion 210, and one or more pairs of pass-through manifold portions 215. Each inlet manifold portion is configured to engage with the flow plate inlet region 310 to provide cathode, anode, and coolant fluid flow to the appropriate faces of the flow plate. Each outlet manifold portion 210 is configured to engage with flow plate outlet region 320 to allow for cathode and anode exhaust from the flow plate. The pass-through manifold portions 215 are configured to engage with flow plate side seal regions 305. As shown schematically in FIGS. 9 and 10, different shapes of flow field areas can be provided. Flow field areas can have any even number (2n) of sides. A fuel cell unit is formed from (n) flow plate assemblies disposed in a stack configuration, with each adjacent flow plate assembly oriented at an offset angle of (360°/2n).

Figure 9:
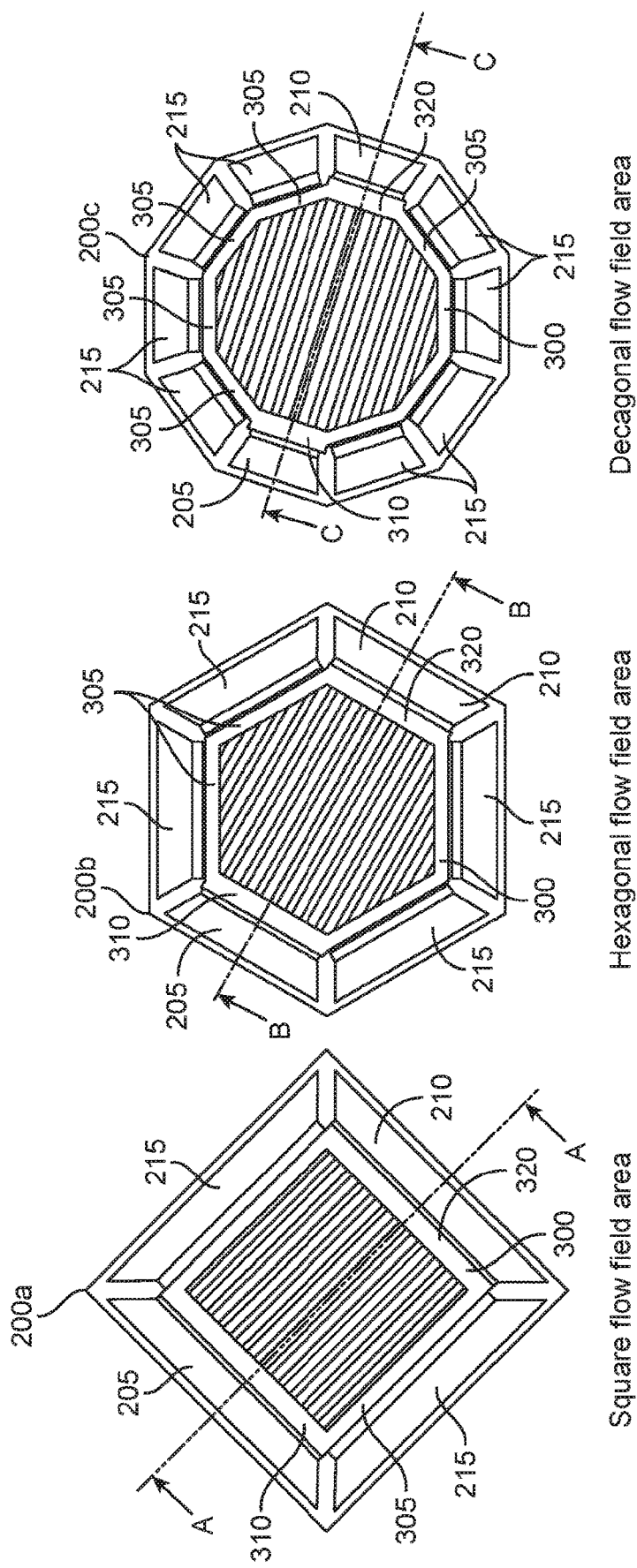
FIG. 9 shows schematic illustrations of three exemplary fuel cell flow plate assemblies.

In FIG. 9, top-down views of three different flow plate assembly implementations are shown. Each top-down view shows on flow plate assembly having a flow plate 300, and a fluid manifold periphery plate 200, and a membrane electrode assembly (not visible on the underside of the components shown). A square flow field area implementation, shown schematically as the left portion of FIG. 9, utilizes flow plates having one pair of flow plate side seal regions 305 that are configured to engage with one pair of pass-through manifold regions 215. Accordingly, a four-sided flow plate is provided (n=2), and a fuel cell unit can be formed from (n=2) of the flow plate assemblies shown, with the second flow plate assembly oriented at an offset angle of (360°/2n=90°), such that the axis A-A for the second flow plate assembly would be offset at 90° from the first flow plate assembly's axis A-A. A hexagonal flow field area implementation is shown schematically in the central portion of FIG. 9, and has flow plates having two pairs of flow plate side seal regions 305 that are configured to engage with two pairs of pass-through manifold regions 215. Accordingly, a six-sided flow plate is provided (n=3), and a fuel cell unit can be formed from (n=3) of the flow plate assemblies shown, with the second and third flow plate assembly oriented at offset angles of (360°/2n=60°), such that the axis B-B for the second flow plate assembly would be offset at 60° from the first plate assembly's axis B-B, and the axis B-B for a third plate would be offset a further 60° from the second plate assembly's axis B-B (and 120° offset from the B-B axis of the first flow plate assembly). Similarly, the decagonal flow field area implementation shown in the right portion of FIG. 9 has flow plates having four pairs of flow plate side seal regions 305 that are configured to engage with four pairs of pass-through manifold regions 215. A fuel cell unit using decagonal flow field area flow plates would be formed from (n=5) of the flow plate assemblies shown, with second, third, fourth, and fifth flow plate assemblies each offset at offset angles of (360°/2n=36°) such that the axes C-C of each pair of adjacent flow plate assemblies are offset by 36°. In each fuel cell unit formed from (n) flow plate assemblies in a stack configuration, the inlet manifold portions 205 of the (n) flow plate assemblies in the stack step through (n) consecutive positions of rotation to sit within a 180° portion of the periphery circumference of the stack, while the outlet manifold portions 210 step through (n) consecutive positions of rotation in the opposing 180° portion of the periphery circumference of the stack. Accordingly, a 180° portion of the fluid manifold periphery plates in the fuel cell unit can be utilized for inlet fluid flows, while the opposing 180° portion can be utilized for outlet fluid flow.

Importantly, each flow plate assembly within a fuel cell unit can utilize identical or substantially identical components, allowing for parallel assembly in manufacturing and the use of the same tooling or molding for each component type. Further, each fuel cell unit can be assembled in parallel, and then a fuel cell stack can be assembled by stacking identical fuel cell units in aligned orientation, such that the 180° portions of the fluid manifold periphery plates in each fuel cell unit utilized for inlet fluid flows are aligned, while the opposing 180° portions utilized for outlet fluid flows are aligned. Accordingly, a fuel cell stack having a plurality of offset flow plates can be assembled using identical flow plates made with the same tooling or molds, but providing the improved membrane compression profiles in comparison to a non-offset arrangement and providing improved cell-to-cell mechanical stability during stacking and compression and reduced flow plate buckling or curvature (as described more fully above).

Figure 21A:
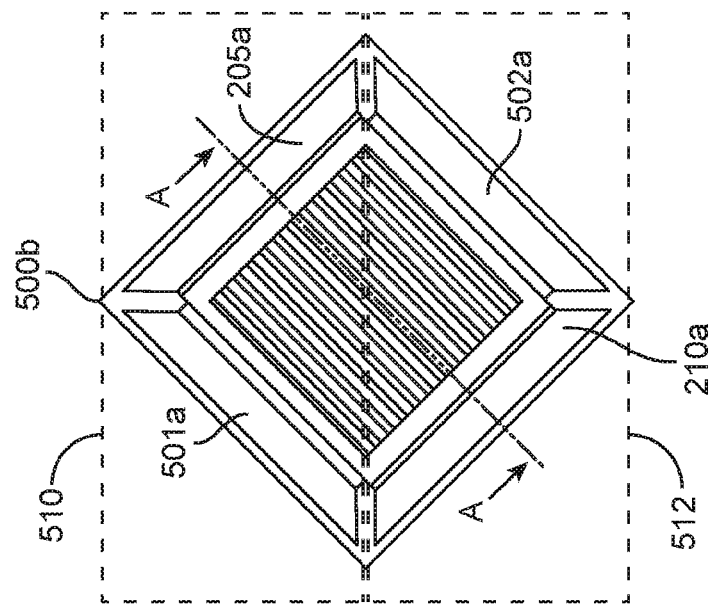
FIGS. 21A and 21B show schematic illustrations of exemplary flow plate assemblies.
Figure 21B:
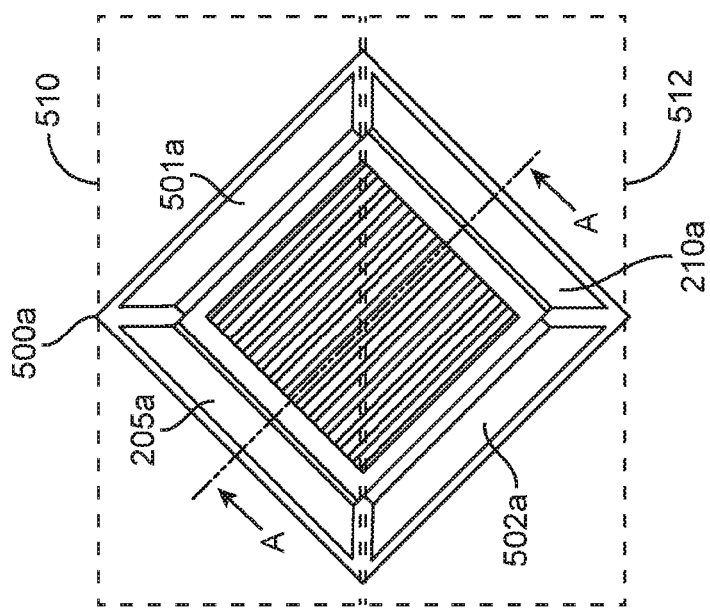
Figure 22A:
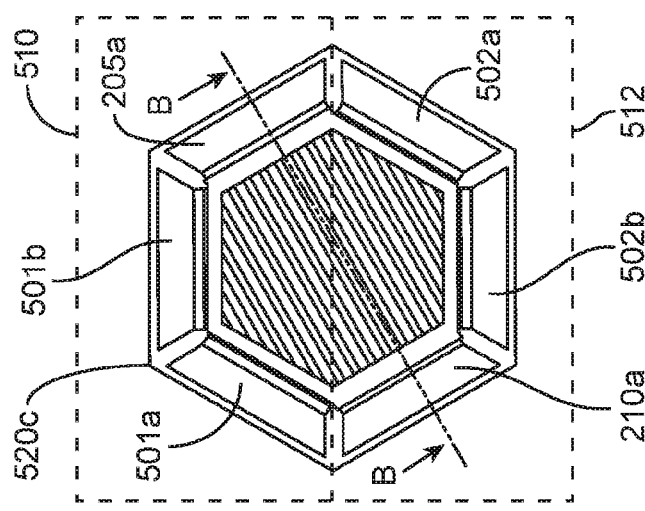
FIGS. 22A, 22B, and 22C show schematic illustrations of exemplary flow plate assemblies.
Figure 22B:
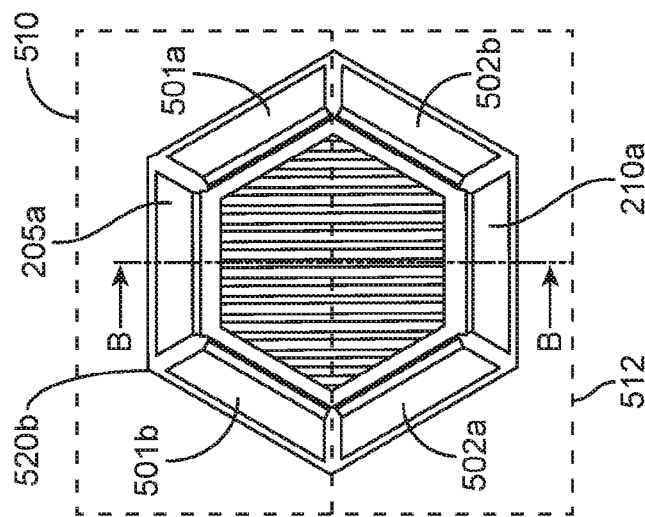
Figure 22C:
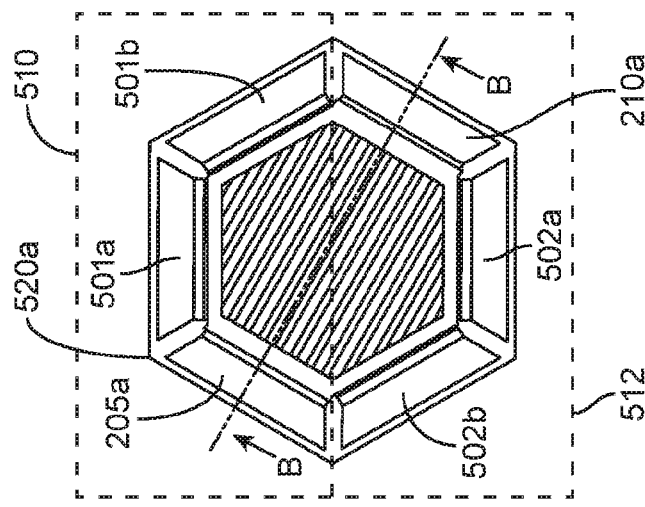

FIGS. 21A-B and 22A-C illustrate schematically flow plate assemblies that can be utilized in some implementations. FIGS. 21A and 21B illustrate a set of two flow plate assemblies that can be utilized in a square flow field area implementation. Flow plate assemblies 500a and 500b are each formed from an implementation of a flow plate 300, a fluid manifold periphery plate 200, and a membrane electrode assembly (not visible on the underside of the components shown) as shown and described in FIG. 9. A 180° portion 510 of the fluid manifold periphery plates in each fuel cell unit is utilized for inlet fluid flows, while an opposing 180° portion 510 is utilized for outlet fluid flows. The flow plate assemblies 500a and 500b can be stacked together with the 180° inlet and outlet portions 510/512 in alignment to form a fuel cell unit. The pairs of pass-through manifold regions 215 of FIG. 9 are implemented as inlet pass-through manifold region 501a and outlet pass-through manifold region 502a. As the inlet manifold portions 205a of the two flow plate assemblies 500a/500b step through the two consecutive positions of rotation to sit within the 180° inlet portion 510 and the outlet manifold portion 210a steps through the two consecutive positions of rotation in the opposing 180° outlet portion, the inlet pass-through manifold region 501a and outlet pass-through manifold region 502a are positioned in the remaining sections of the 180° inlet and outlet portions 510/512. The fluid manifold periphery plates within the flow plate assemblies 500a and 500b may not be identical, as the consecutive ordering of the regions is 205a, 501a, 210a, and 502a in the flow plate assembly 500a and 501a. 205a, 502a, and 210a in the flow plate assembly 500b. In a fuel cell stack formed from a plurality of fuel cell units formed from flow plate assemblies 500a and 500b, the inlet regions would have alternating layers of regions 205a and 501a while the outlet regions would have alternating layers of 210a and 502a. In manufacturing the fluid manifold periphery plates for flow plate assemblies 500a and 500b, the fluid manifold periphery plates can be formed with the same overall tooling, but using different insert locations (akin to printing press typesetting) to produce the two different parts. In some implementations, the pass-through manifold regions 501a and 502a may have identical designs, in which case the fluid manifold periphery plates would be identical and only require one set of manufacturing tooling to produce. FIGS. 22A, 22B, and 22C illustrate a set of three flow plate assemblies that can be utilized in a hexagonal flow field area implementation. Flow plate assemblies 520a, 520b, and 520c are each formed from an implementation of a flow plate 300, a fluid manifold periphery plate 200, and a membrane electrode assembly (not visible on the underside of the components shown) as shown and described in FIG. 9. A 180° portion 510 of the fluid manifold periphery plates in each fuel cell unit is utilized for inlet fluid flows, while an opposing 180° portion 510 is utilized for outlet fluid flows. The flow plate assemblies 520a. 520b, and 520c can be stacked together with the 180° inlet and outlet portions 510/512 in alignment to form a fuel cell unit. The pairs of pass-through manifold regions 215 of FIG. 9 are implemented as inlet pass-through manifold regions 501a and 501b and outlet pass-through manifold regions 502a and 502b, with 501a and 502a paired across from each other and 501b and 502b paired across from each other. As the inlet manifold portions 205a of the three flow plate assemblies 520a/520b/520c step through the three consecutive positions of rotation to sit within the 180° inlet portion 510 and the outlet manifold portions 210a step through the three consecutive positions of rotation in the opposing 180° outlet portion, the inlet pass-through manifold regions 501a/501b and outlet pass-through manifold regions 502a/502b are positioned in the remaining sections of the 180° inlet and outlet portions 510/512. The fluid manifold periphery plates within the flow plate assemblies 520a, 520b, and 520c may not be identical, as the consecutive ordering of the regions is 205a, 501a, 501b, 210a, 502a. 502b in the flow plate assembly 520a, the consecutive ordering of the regions is 501*b*, 205*a*, 501*a*, 502*b*, 210*a*, and 502*a* in the flow plate assembly 520*b*, and the consecutive ordering of the regions is 501*a*, 501*b*, 205*a*. 502*a*. 502*b*, and 210*a* in the flow plate assembly 520*c*. In a fuel cell stack formed from a plurality of fuel cell units formed from flow plate assemblies 520*a*, 520*b*, and 520*c*, the inlet regions would have consecutive layers of regions 205*a*. 501*b*, and 501*a* repeated in series, while the outlet regions would have consecutive layers of regions 210*a*, 502*b*, and 502*a* repeated in series. In manufacturing the fluid manifold periphery plates for flow plate assemblies 520*a*, 520*b*, and 520*c* the fluid manifold periphery plates can be formed with the same overall tooling, but using different insert locations (akin to printing press typesetting) to produce the two different parts. In some implementations, the pass-through manifold regions 501*a*, 502*a*, 501*b*, and 502*b* may have identical designs, in which case the fluid manifold periphery plates would be identical and only require one set of manufacturing tooling to produce.

Figure 10:
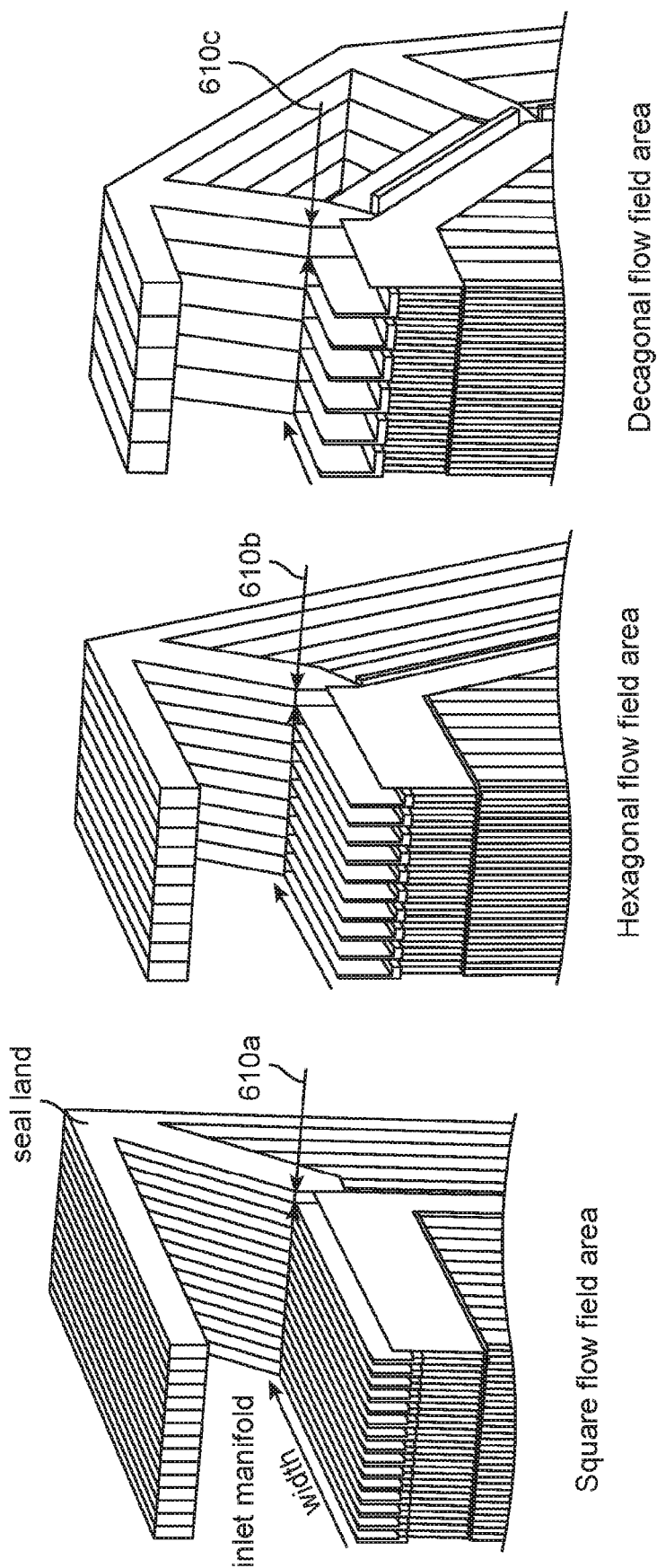
FIG. 10 shows schematic illustrations of perspective cutaway views of three exemplary fuel cell stacks formed from pluralities of the flow plate assemblies shown in FIG. 9.

FIG. 10 schematically shows some further benefits of the implementations shown in FIG. 9. The fluid manifold depth 610 can be increased by using the offset arrangements of the flow plate assemblies. For a number (n), the flow plate depth is increased n-fold over the cell pitch depth of the fuel cell unit. e.g., the flow plate depth 610*a* is twice as deep as the cell pitch depth for a (n=2) square flow field area (shown schematically in left portion of FIG. 10), the flow plate depth 610*b* is three times as deep as the cell pitch depth for a (n=3) hexagonal flow field area (shown schematically in central portion of FIG. 10), and the flow plate depth 610*c* is five times as deep as the cell pitch depth for a (n=5) decagonal flow field area (shown schematically in right portion of FIG. 10). As described more fully above, providing an increased depth for fluid flow from the fluid inlet manifold pathways for cathode fluid, anode fluid, and coolant fluid can reduce the pressure drop for fluid flows through the cell periphery to enable more consistent cell-to-cell performance and enable higher current draws. The benefits of these deeper fluid flow pathways are increased as cell pitch depth is minimized to provide for a maximized volumetric power density of a fuel cell system. Manifold width reduces with an increasing number (2n) of sides to the flow field, but the total flow rate of fluids through the stack assembly is split across (n) inlet manifold portions 205 around the 180° portion the fluid manifold periphery plates.

FIGS. 11-20 show aspects of a fuel cell stack assembly utilizing fuel cell units that each have two square flow field area flow plate assemblies oriented with a 90° offset angle. In the nomenclature discussed above regarding FIGS. 9 and 10, the exemplary implementations shown have (n=2), with each flow plate having one pair of flow plate side seal regions 305 that are configured to engage with one pair of pass-through manifold regions 215. Those of skill in the art can appreciate that the exemplary implementations shown can be modified to provide for implementations having higher numbers of pairs of flow plate side seal regions 305, such as the hexagonal or decagonal flow field area implementations shown schematically in FIGS. 9 and 10, by altering the geometry of the inlet manifold portions 205, outlet manifold portions 210, and pass-through manifold portions 215 and features therein to conform to the available angular portions of the fluid manifold periphery plates. Component features and methods for providing multiple different fluid flows into channels across the full width of the flow fields can include those described in the U.S. Patent Pre-Grant Publication US2015/0333344A1, entitled "Fluid Flow Plate for a Fuel Cell," the entirety of which is incorporated herein.

Figure 11:
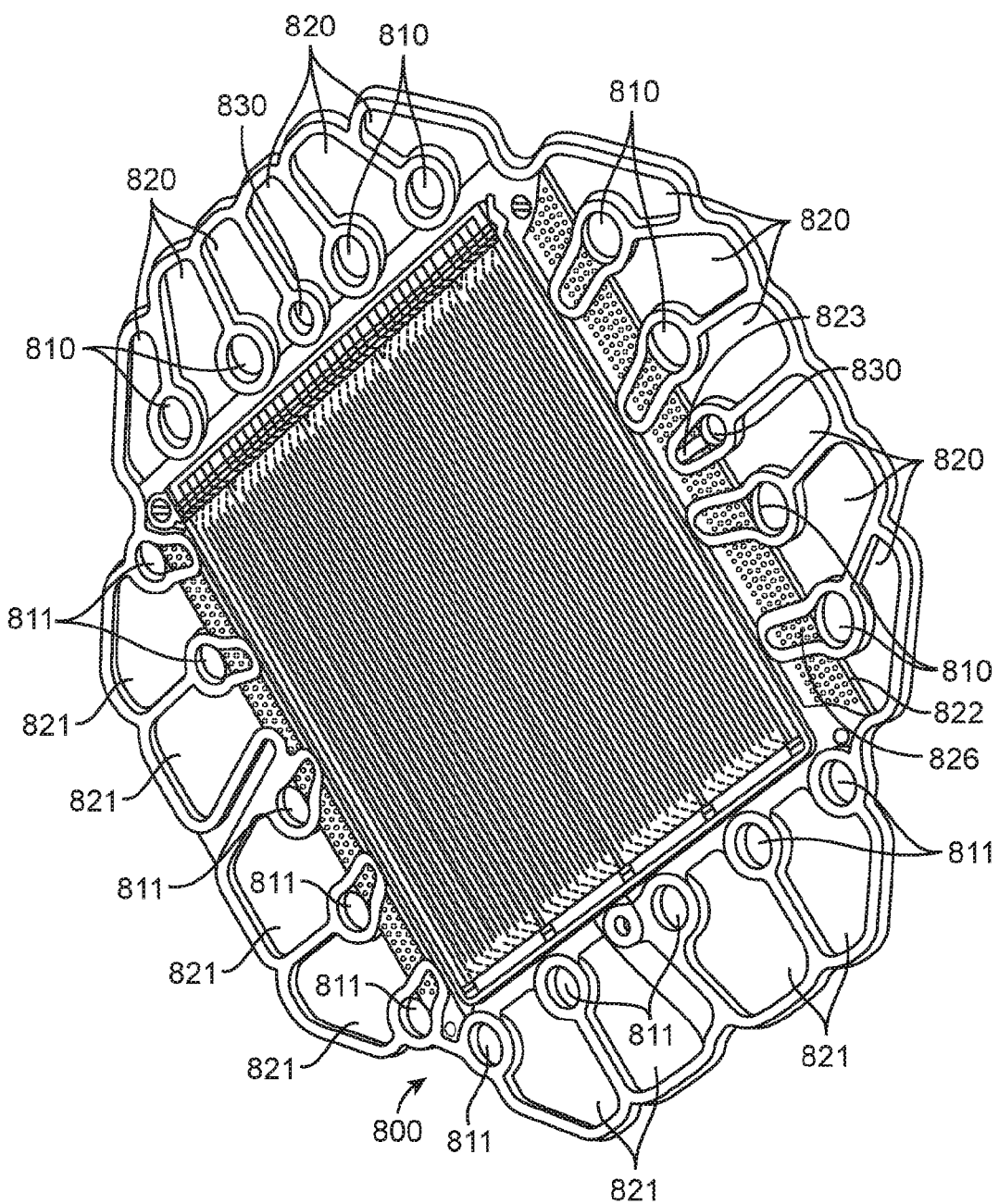
FIG. 11 illustrates aspects of a portion of a fuel cell stack of the disclosure.
Figure 12:
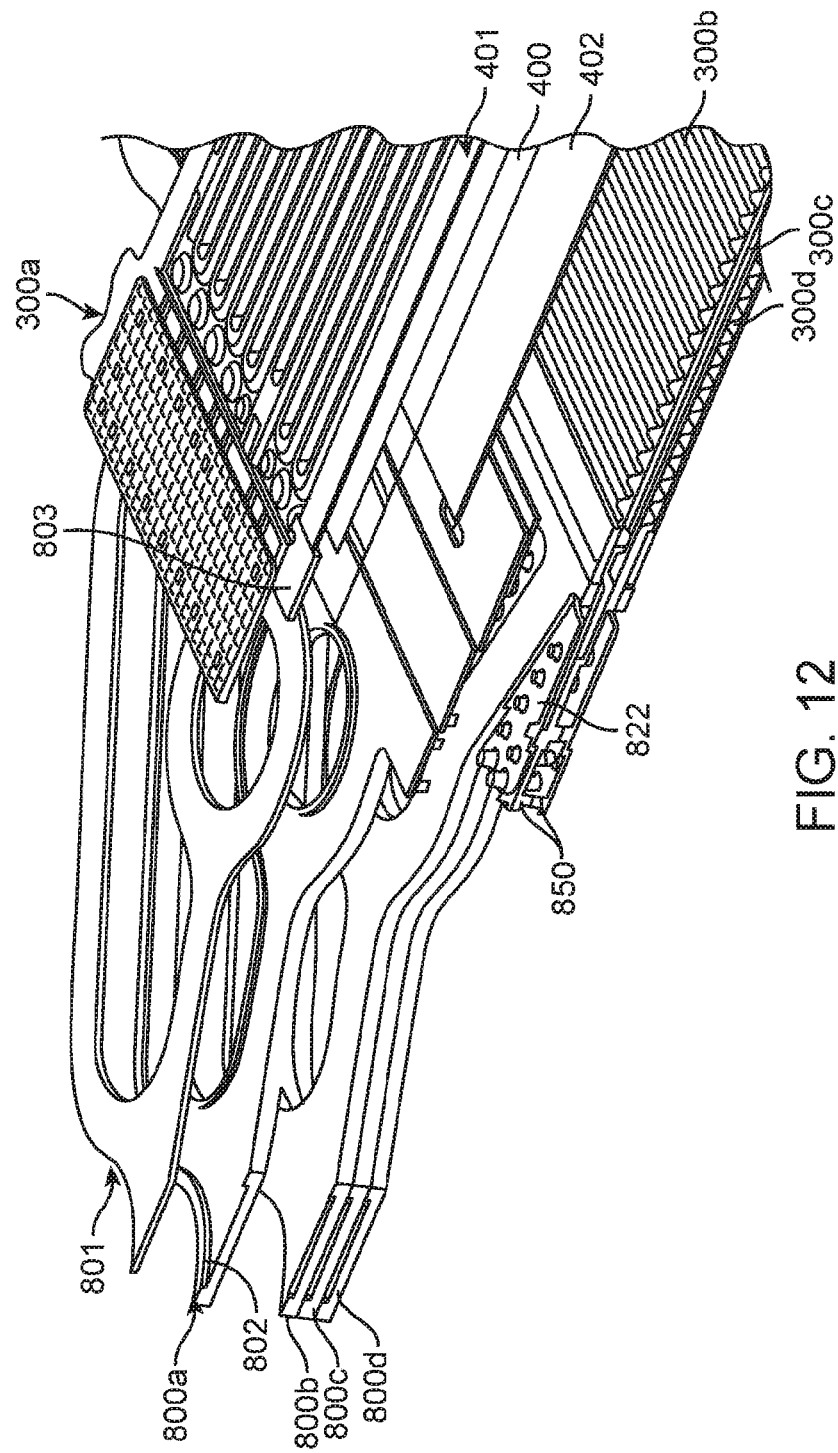
FIG. 12 shows an exploded cut-away view of aspects of the fuel cell stack of FIG. 11.

FIGS. 11-20 shows aspects of a portion of an exemplary implementation of a fuel cell stack of the disclosure and depict aspects of a combination of two fuel cell units, with each fuel cell unit formed from two square flow field area flow plate assemblies oriented with 900 offset angles. FIG. 11 shows a perspective view of the top-most flow plate assembly in the stacked arrangement. Fluid manifold periphery plate 800 is shown, which corresponds to the schematically depicted fluid manifold periphery plate 200 in FIGS. 9-10. In fluid manifold periphery plate 800, inlet manifold portion 205 is formed from anode inlets 810, cathode inlets 820, and coolant inlets 830. In fluid manifold periphery plate 800, outlet manifold portion 210 is formed from anode outlets 811 and cathode outlets 821. Each fluid manifold periphery plate 800 is formed with sealing retention features 802 which retain an inter-cell sealing element 801. In fluid manifold periphery plate 800, one pass-through manifold portion 215 is also formed with anode inlets 810, cathode inlets 820, and coolant inlets 830, which correspond to the inlets 810, 820, and 830 of the fluid manifold periphery plate 800 directly adjacent to it. In fluid manifold periphery plate 800, the other pass-through manifold portion 215 is formed with anode outlets 811 and cathode outlets 821, which correspond to the outlets 810 and 821 of the fluid manifold periphery plate 800 directly adjacent to it. As seen in FIG. 12, the top-most fuel cell unit is formed with fluid manifold periphery plates 800*a* and 800*b*, while the underlying adjacent fuel cell unit is formed with fluid manifold periphery plates 800*c* and 800*d*. Each of the fluid manifold periphery plates 800*a/b/c/d* has a membrane electrode assembly 400/401/402 and respective flow plate 300*a/b/c/d* disposed thereon.

Figure 13:
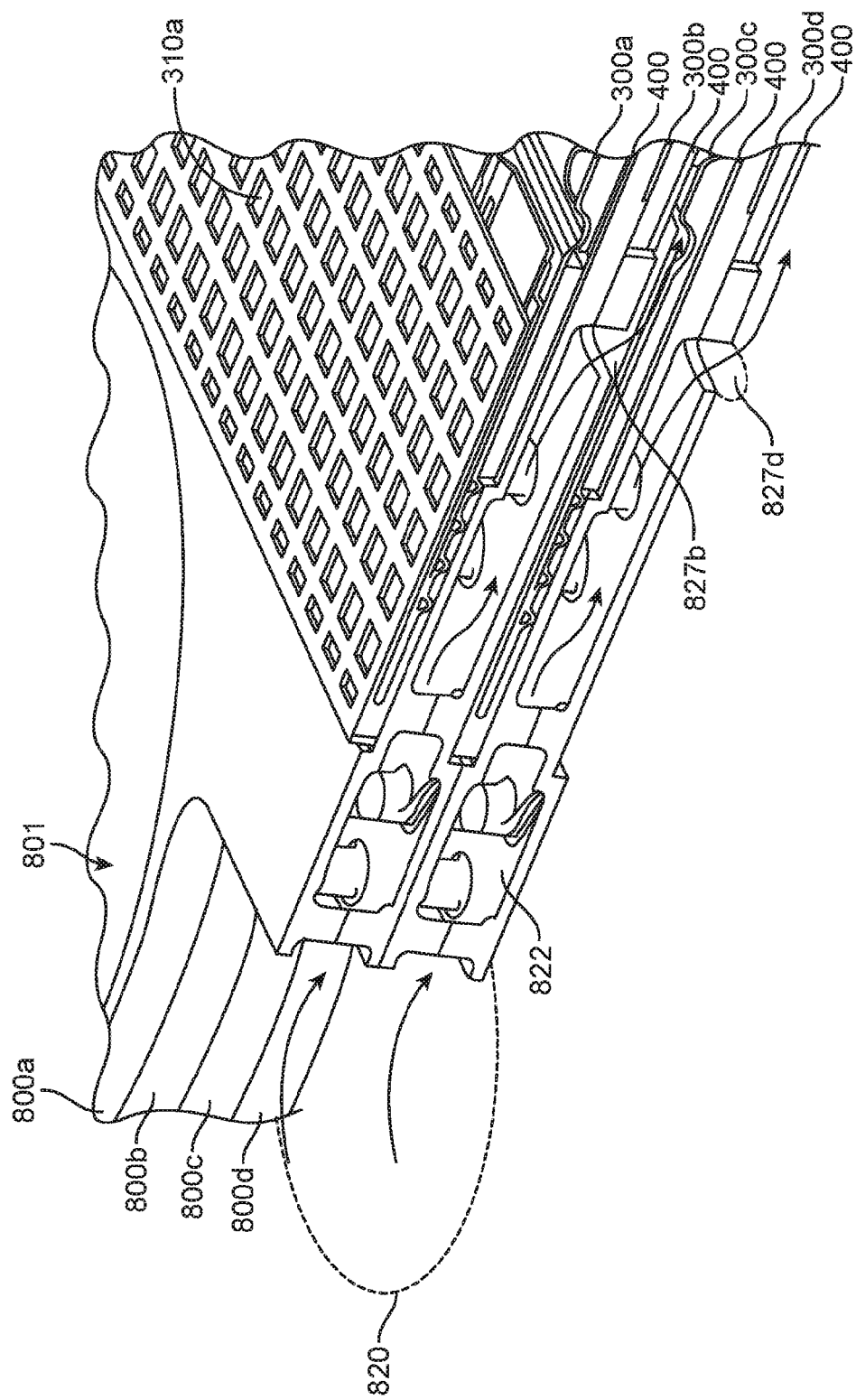
FIG. 13 illustrates aspects of the fuel cell stack of FIG. 11 in a cutaway perspective view along a cathode inlet to show aspects of cathode fluid flow pathways.

FIG. 12 shows an exploded cut-away view of aspects of the exemplary implementation fuel cell stack of FIG. 11, with a cutaway provided along a cathode inlet. Membranes 400 are provided with one or more anode gas diffusion layers 401 and one or more cathode gas diffusion layers 402. An anode support frame element 803 is provided underneath flow plate inlet region 310 or flow plate 300 to support the components when the stack is under compression and provide for proper alignment of the components forming the fluid flow pathways. A portion of a cathode manifold entry 822 can be seen, can be provided with projections or protrusions 850 which provide support against the compression forces on the stack while allowing for cathode fluid flow through the cathode fluid flow pathway along cathode manifold entry 822 to cathode manifold pass-through 827 which leads to the cathode fluid flow channels 330. FIG. 13 illustrates aspects of the fuel cell stack of FIG. 11 in a cutaway perspective view along a cathode inlet to show aspects of cathode fluid flow pathways, with the cathode fluid flow pathways shown schematically with arrows in FIG. 13. Cathode fluid flow pathways are formed by the touching faces of adjacent fluid manifold periphery plates 800 in a fuel cell unit, e.g., the underside of plate 800*a* and upperside of plate 800*b* engage with protrusions 850 and form a pathway having approximately twice the cell pitch depth that receives cathode fluid flow from cathode inlet 820 and leads to the cathode manifold pass-through 827 and cathode fluid flow channels 330 of flow plate 300*c*.

Figure 14:
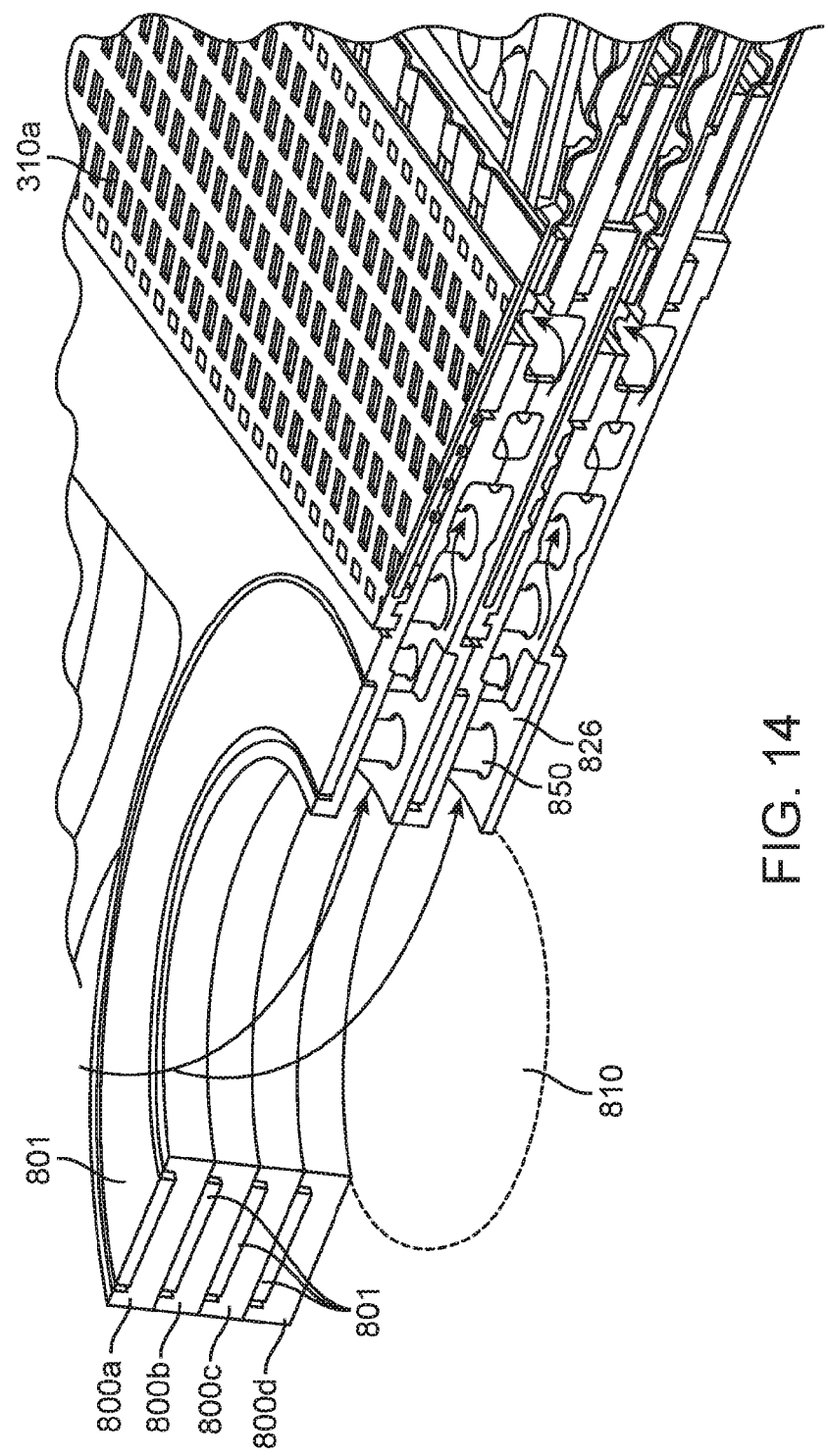
FIG. 14 illustrates aspects of the fuel cell stack of FIG. 11 in a cutaway perspective view along an anode inlet to show aspects of anode fluid flow pathways.

FIG. 14 illustrates aspects of the fuel cell stack of FIG. 11 in a cutaway perspective view along an anode inlet to show aspects of anode fluid flow pathways, with the anode fluid flow pathways shown schematically with arrows in FIG. 14.

A portion of an anode manifold entry 826 can be seen, can be provided with projections or protrusions 850 which provide support against the compression forces on the stack while allowing for anode fluid flow through the anode fluid flow pathway along anode manifold entry 826 to the anode fluid flow channels 315 of the flow plate 300 above. Anode fluid flow pathways are formed by the touching faces of adjacent fluid manifold periphery plates 800 in a fuel cell unit, e.g., the underside of plate 800a and upperside of plate 800b engage with protrusions 850 and form a pathway having approximately twice the cell pitch depth that receives anode fluid flow from anode inlet 810 and leads to the anode fluid flow channels 315 of flow plate 300a.

Figure 15:
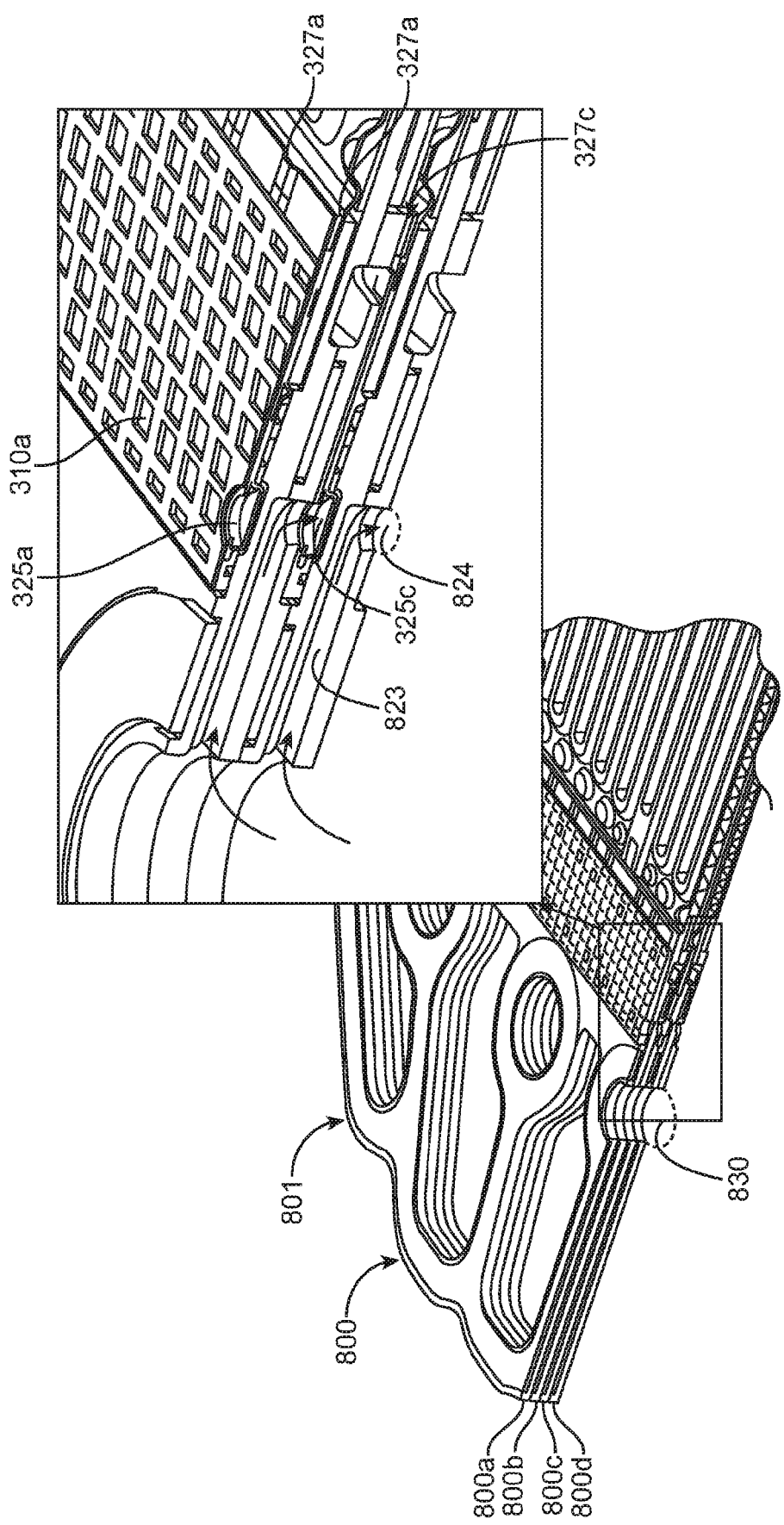
FIG. 15 illustrates aspects of the fuel cell stack of FIG. 11 in a cutaway perspective view along a coolant inlet to show aspects of coolant fluid flow pathways.

FIG. 15 illustrates aspects of the fuel cell stack of FIG. 11 in a cutaway perspective view along a coolant inlet to show aspects of coolant fluid flow pathways, with the coolant fluid flow pathways shown schematically with arrows in FIG. 15. A portion of coolant manifold entry 823 and coolant manifold hole 824 can be seen. Coolant manifold entry 823 is formed as a conduit connecting coolant inlet 830 to the coolant manifold hole 824, which is aligned with plate coolant flow entry hole 325. Coolant fluid flow pathways are formed by the touching faces of adjacent fluid manifold periphery plates 800 in a fuel cell unit, e.g., the underside of plate 800a and upperside of plate 800b (which is provided with coolant manifold entry 823) engage to form a pathway having approximately twice the cell pitch depth that receives coolant fluid flow from coolant inlet 830 and leads to the plate coolant flow entry hole 325c of flow plate 300c. i.e. the coolant flow entry hole of the top-most flow plate of the next identical fuel cell unit in the overall fuel cell stack. In the implementation shown, coolant fluid flows into a coolant entry volume formed by a folded-over plate edge in flow plate inlet region 310, which contains internal coolant fluid distribution channels (not shown) that lead to plate coolant flow egresses 327. Upon exiting the plate coolant flow egresses, the coolant fluid mixes with the cathode fluid flow in the cathode flow channels 330 to provide evaporative cooling and to hydrate the membrane. In alternative arrangements, coolant fluid can be provided into the anode fluid flow in addition to or instead of the cathode fluid flow.

Figure 16:
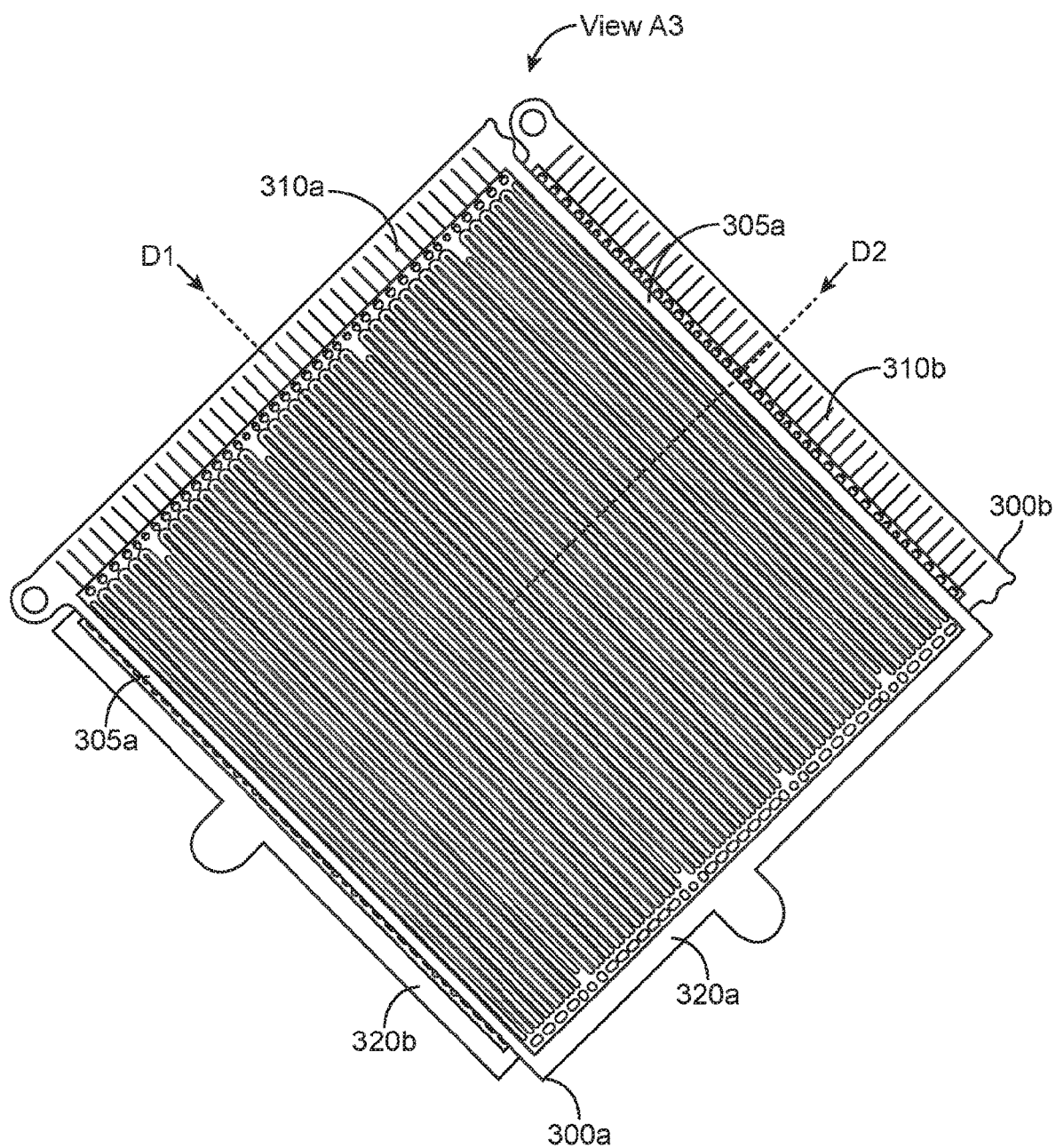
FIG. 16 illustrates aspects of the fuel cell stack of FIG. 11 in a top-down view of the flow plates shown without fluid manifold periphery plates.
Figure 17:
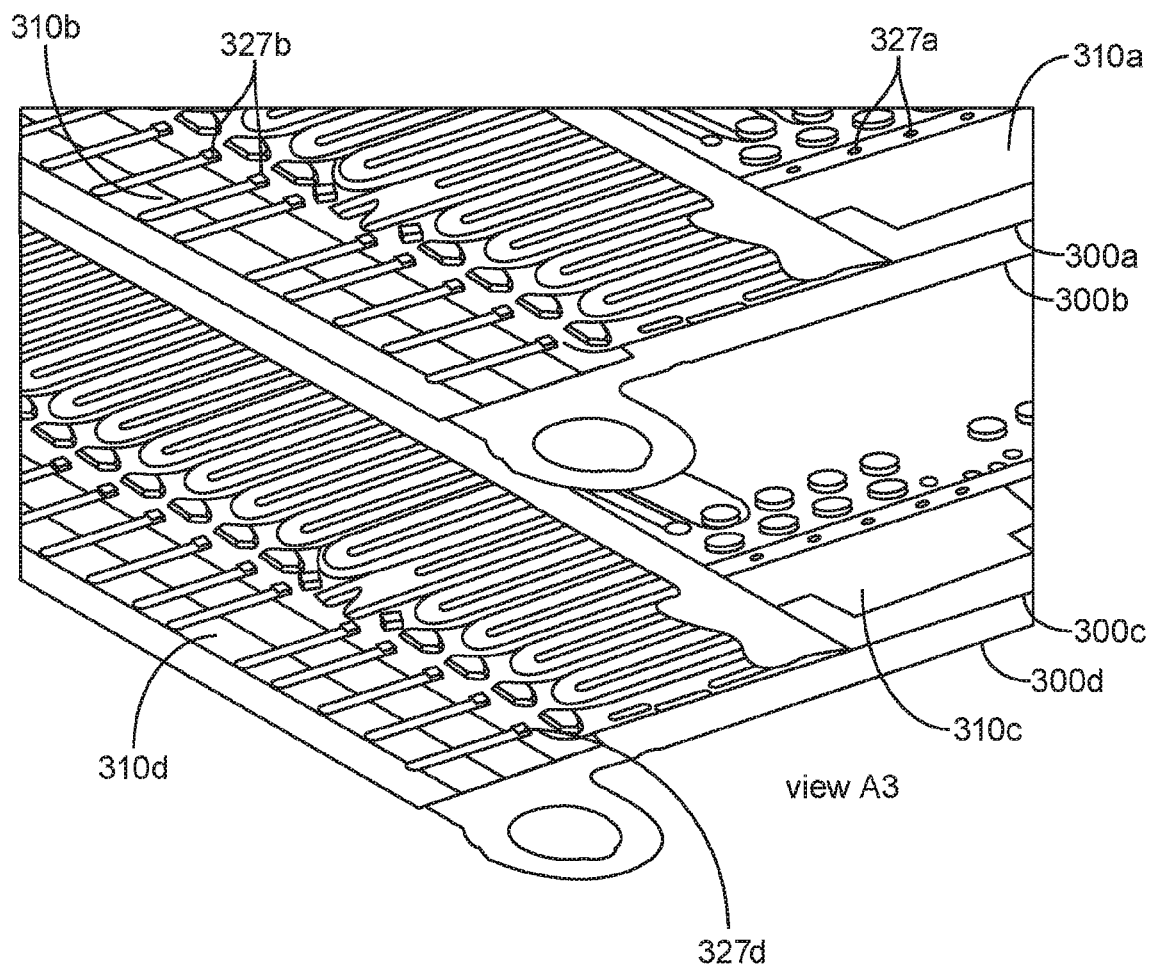
FIG. 17 shows aspects of the fuel cell stack flow plates of FIG. 16 in an exploded assembly perspective view of View A3 of FIG. 16.
Figure 18:
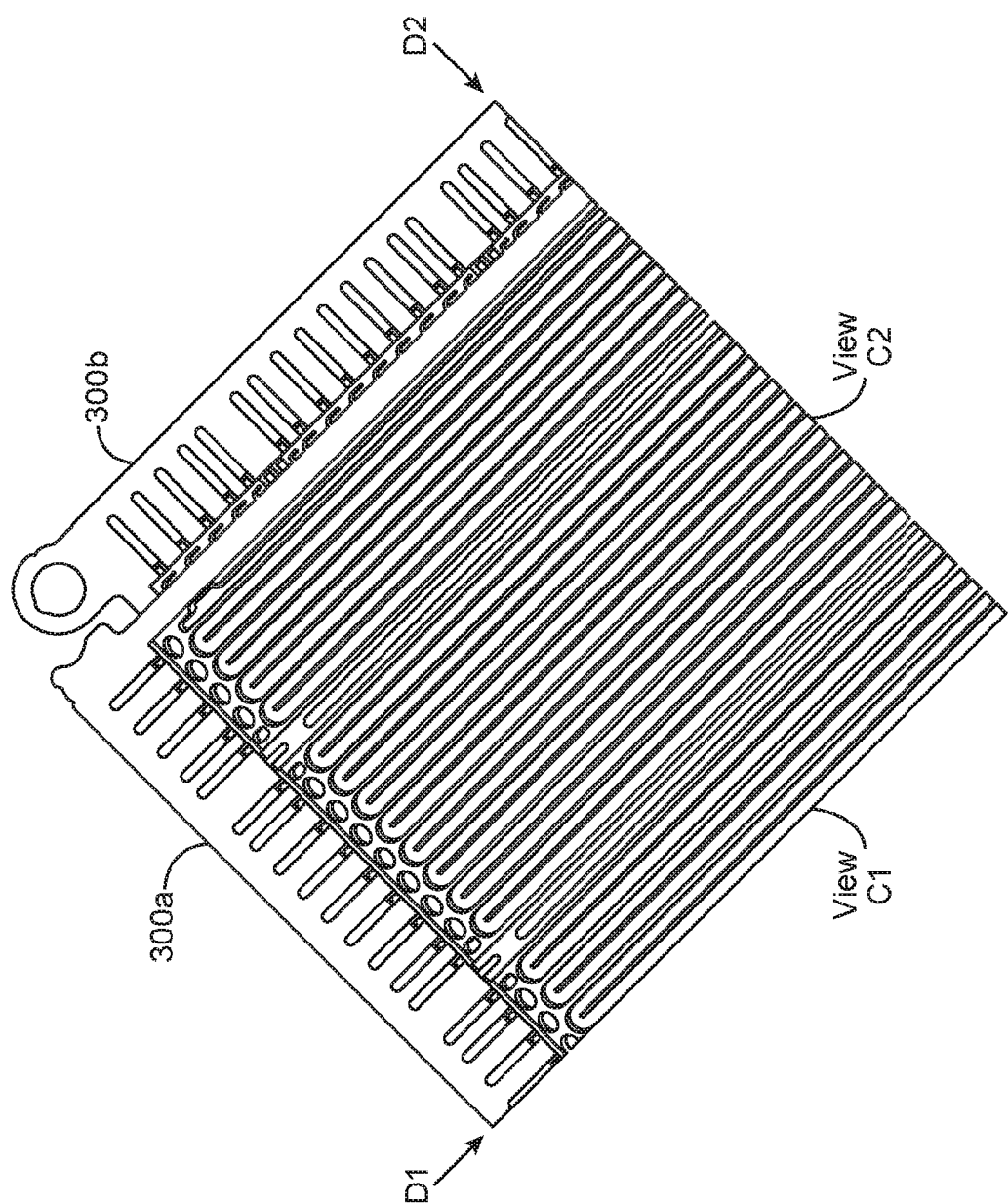
FIG. 18 shows a partial view of the top-down view shown in FIG. 16, with cuts along lines D1 and D2 shown in FIG. 1.
Figure 19:
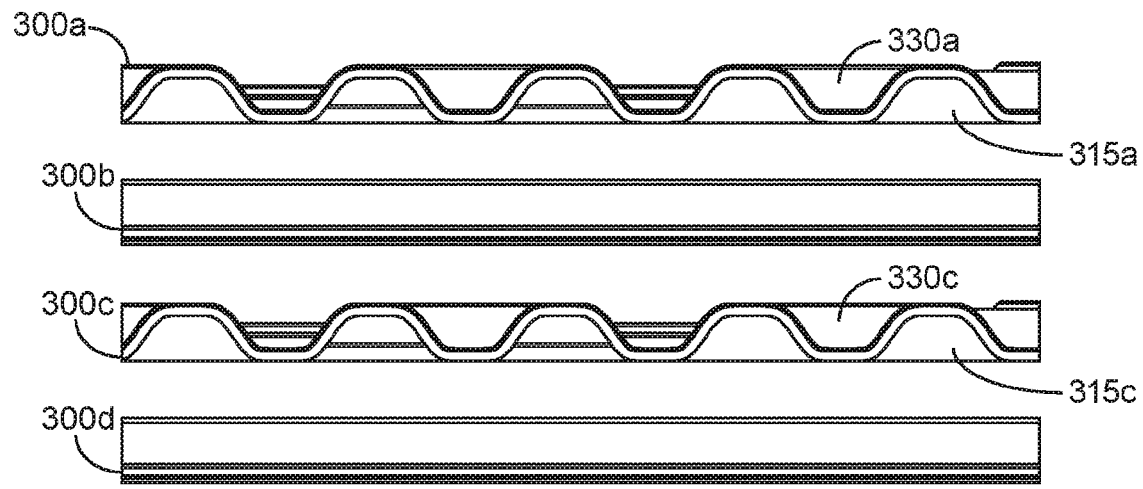
FIG. 19 shows aspects of the fuel cell stack flow plates of FIG. 18 in an exploded assembly side view of View C2 of FIG. 18.
Figure 20:
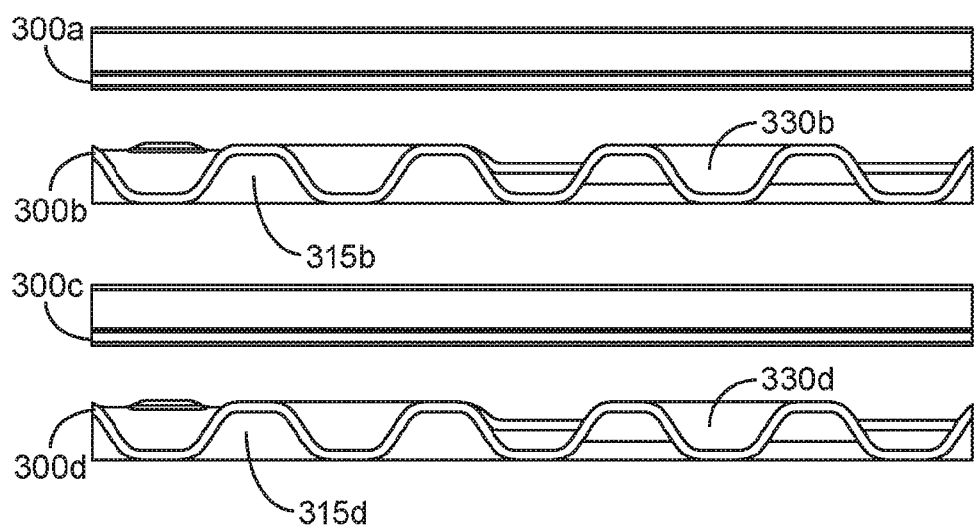
FIG. 20 shows aspects of the fuel cell stack flow plates of FIG. 18 in an exploded assembly side view of View C1 of FIG. 18.

FIGS. 16-20 show aspects of the portion of a fuel cell stack of FIGS. 11-15 as a combination of two fuel cell units, with each fuel cell unit formed from two square flow field area flow plate assemblies oriented with 90° offset angles. FIGS. 16-20 show aspects of an exploded assembly view of the flow plates 300a, 300b, 300c, and 300d, with the flow plates separated for illustrative purposes further apart than in final assembly and compression. FIG. 16 shows a top-down view, in which flow plates 300a and 300b can be seen. FIG. 17 shows a perspective view from View A3 shown in FIG. 16. FIG. 18 shows a top-down view of FIG. 16, but cut-away along lines D1 and D2 shown in FIG. 16. FIG. 19 shows a side-view of a portion of the flow plates 300a/b/c/d as seen along View C2 shown in FIG. 18. FIG. 20 shows a side-view of a portion of the flow plates 300a/b/c/d as seen along View C1 shown in FIG. 18. The corrugations of the flow plates 300a/b/c/d are shown as generally truncated sinusoidal shapes, providing roughly equal volumes to the cathode and anode flow channels 315/330. It is believed that the truncated sinusoidal shape provides benefits by providing larger flat-to-flat contact surface interference regions between adjacent cross-flowed channels in the adjacent flow plates. This arrangement provides for a larger contact area for normal compression of the membrane electrode assembly layers 400/401/402 to prevent deformation/conformation of the membrane. Alternative shaped profiles of the corrugations that provide the cathode and anode flow channels 315/330 can be utilized in other implementations to optimize electrical performance under various operating conditions, such as for different cathode fluids (air or oxygen) at different flow rates, for example. Shaped profiles can be limited by stretching and bunching limits of plate formation from a sheet stock material.

Flow plates 300 can be formed from a metal plate via a stamping/pressing manufacturing process. In the implementations shown, a coolant entry volume can be formed by a folded-over plate edge in flow plate inlet region 310, to provide internal coolant fluid distribution channels (not shown) that lead to plate coolant flow egresses 327. Suitable structures for the flow plates 300 and folded-over plate edge formation of coolant entry volumes are more fully described in International Patent Application No. PCT/GB2007/001573, published as International Publication No. WO 2007/129030 A1, International Patent Application No. PCT/GB2013/050634, published as International Publication No. WO 2013/140135 A2, International Patent Application No. PCT/GB2015/054020, published as International Publication No. WO 2016/097716 A1, and co-pending application entitled "PLASTIC FRAME ASSEMBLY AND BIPOLAR PLATE WITH THROUGH-FLOW FUEL FEED" filed contemporaneously with this application by the applicant, the entireties of which are incorporated herein for all purposes. Suitable metals include stainless steels that provide necessary malleability to elongate as necessary during stamping/pressing to form corrugations. Alternatively, flow plate 300 can be formed by other manufacturing methods and from other materials compatible with the mechanical compression and operating temperatures of the fuel cell stack and chemicals used as fluid reactants.

The fluid manifold periphery plate 800 can be formed from a rigid material. Suitable rigid materials include polymers that can provide support and electrical insulation. The material can be formed by any methods known in the art, including injection molding or additive manufacturing. Inter-cell sealing element 801 is formed from a compressible material in order to provide for a continuous sealing feature around the periphery. In some implementations, inter-cell sealing element 801 is formed separately from fluid manifold periphery plate 800 and then subsequently positioned into the sealing retention feature 802. In other implementations, the inter-cell sealing element 801 may be formed in place on fluid manifold periphery plate via an overmolding process, additive manufacturing process, or fluid dispensing process. In further implementations, the fluid manifold periphery plate 800 and inter-cell sealing element 801 can be formed together in a 2-shot molding (2K molding) process.

In some implementations, the fuel stack assemblies described herein may be used in an evaporatively cooled fuel cell operation. Methods of operating EC fuel cells are described more fully in U.S. Patent Pre-Grant Publication US2015/0236361A1, entitled "Coolant fluid feed to fuel cell stacks, and International Patent Publication WO2016/034853A1, entitled "Fuel cell system," and International Patent Publication WO2015/140529A1, entitled "Fuel cell stack," the entireties of which are incorporated herein for all purposes. The fuel cell stack assembly can be provided with cathode fluid, anode fluid, and coolant fluid inputs via a flow control assembly that provides the desired flow rates for each fluid for optimal operation. Exhaust flows can be collected from the outlet manifolding via anode outlets 811 and cathode outlets 821, and water content in the exhaust flows can be captured and reused in further operation for cooling or hydrating the stack.

In some aspects, the present disclosure provides for improved manufacturing processes for a fuel cell stack assembly. A plurality of flow plates 300 can be formed in parallel and assembled into flow plate assemblies using a plurality of fluid manifold periphery plates 200/800 and membrane assembly components 400/401/402. This assembly operation can be done in parallel. Fuel cell units can then be assembled using a plurality (n) flow plate assemblies arranged in a stack provided at offset angles from each other, as described more fully above. The rigid fluid manifold periphery plates 200/800 provide for proper alignment of the inlet and outlet flows through the stack height through the anode inlets 810, cathode inlets 820, coolant inlets 830, anode outlets 811, and cathode outlets 821. Fuel cell units can be assembled in parallel in a manufacturing process, and then combined together into a fuel cell stack. Such parallel manufacturing processing of components, sub-assemblies, and assemblies provides for commercial benefits in operation.

Those of ordinary skill in the art will appreciate that a variety of materials can be used in the manufacturing of the components in the devices and systems disclosed herein. Any suitable structure and/or material can be used for the various features described herein, and a skilled artisan will be able to select an appropriate structures and materials based on various considerations, including the intended use of the systems disclosed herein, the intended arena within which they will be used, and the equipment and/or accessories with which they are intended to be used, among other considerations. Conventional polymeric, metal-polymer composites, ceramics, and metal materials are suitable for use in the various components. Materials hereinafter discovered and/or developed that are determined to be suitable for use in the features and elements described herein would also be considered acceptable.

When ranges are used herein for physical properties, such as molecular weight, or chemical properties, such as chemical formulae, all combinations, and subcombinations of ranges for specific exemplar therein are intended to be included.

The disclosures of each patent, patent application, and publication cited or described in this document are hereby incorporated herein by reference, in its entirety.

Those of ordinary skill in the art will appreciate that numerous changes and modifications can be made to the exemplars of the disclosure and that such changes and modifications can be made without departing from the spirit of the disclosure. It is, therefore, intended that the appended claims cover all such equivalent variations as fall within the true spirit and scope of the disclosure.

The invention claimed is:

1. A fuel cell system comprising:
a plurality of flow plate assemblies disposed in a stack configuration;
wherein each flow plate assembly comprises an identical flow plate (300) and a membrane electrode assembly (400/401/402);
wherein each flow plate (300) comprises a corrugated plate having cathode fluid flow channels (330) on a first face of the corrugated plate and anode fluid flow channels (315) across a second face of the corrugated plate,
wherein the cathode fluid flow channels (330) and anode fluid flow channels (315) are arranged to provide fluid flow from a flow plate inlet region (310) to a flow plate outlet region (320), and the flow plate further comprises one or more pairs of side seal regions (305);
wherein each membrane electrode assembly (400/401/402) is disposed on the first face of the corrugated plate;
wherein each flow plate assembly further comprises a fluid manifold periphery plate (200/800) having an inlet manifold portion (205) configured to engage with the flow plate inlet region (310), an outlet manifold portion (210) configured to engage with the flow plate outlet region (320), and one or more pairs of pass-through manifold portions (215) configured to engage with the one or more pairs of side seal regions (305);
wherein adjacent flow plate assemblies are disposed at an offset angle.

2. The fuel cell unit of claim 1, wherein each flow plate assembly further comprises an inter-cell sealing element (801) disposed on a first surface of the fluid manifold periphery plate (200/800).

3. The fuel cell unit of claim 2, wherein the inter-cell sealing element (801) of each flow plate assembly is retained within a sealing retention feature (802) of the fluid manifold periphery plate (200/800).

4. The fuel cell unit of claim 1, wherein:
each flow plate comprises a square flow field and has one pair of side seal regions (305);
each fluid manifold periphery plate (200/800) has one pair of pass-through manifold portions (215);
the offset angle is 90°; and
the fuel cell unit has two flow plate assemblies disposed in a stack configuration.

5. The fuel cell unit of claim 1, wherein:
each flow plate comprises a hexagonal flow field and has two pairs of side seal regions (305);
each fluid manifold periphery plate (200/800) has two pairs of pass-through manifold portions (215);
the offset angle is 60°; and
the fuel cell unit has three flow plate assemblies disposed in a stack configuration.

6. The fuel cell unit of claim 1, wherein:
each flow plate comprises an octagonal flow field and has three pairs of side seal regions (305);
each fluid manifold periphery plate (200/800) has three pairs of pass-through manifold portions (215);
the offset angle is 45°; and
the fuel cell unit has four flow plate assemblies disposed in a stack configuration.

7. The fuel cell unit of claim 1, wherein:
each flow plate comprises a decagonal flow field and has four pairs of side seal regions (305);
each fluid manifold periphery plate (200/800) has four pairs of pass-through manifold portions (215);
the offset angle is 36°; and
the fuel cell unit has five flow plate assemblies disposed in a stack configuration.

8. The fuel cell unit of claim 1, wherein:
the inlet manifold portion (205) of each fluid manifold periphery plate (200/800) comprises a plurality of anode inlets (810), a plurality of cathode inlets (820), and a coolant inlet (830);
the outlet manifold portion (210) of each fluid manifold periphery plate (200/800) comprises a plurality of anode outlets (811) and a plurality of cathode outlets (821);
the plurality of anode inlets (810), the coolant inlet (830), and the plurality of anode outlets (811) are fluidly connected to the anode flow channels (315) of an associated flow plate (300); and the plurality of cathode inlets (820) and the plurality of cathode outlets (821) are fluidly connected to the cathode flow channels (330) of an associated flow plate (300).

9. A fuel cell stack comprising:
a plurality of identical fuel cell units, the plurality of fuel cell unit of claim 1, with each identical fuel cell unit aligned with an adjacent fuel cell unit with no offset angle.

10. A fuel cell system comprising the fuel cell stack of claim 9.

11. The fuel cell system of claim 9, further comprising:
an anode fluid supply containing anode fluid and fluidly connected to the anode inlets (810) of the fuel cell stack;
a cathode fluid supply containing cathode fluid and fluidly connected to the cathode inlets (820) of the fuel cell stack; and
a coolant fluid supply containing coolant fluid and fluidly connected to the coolant inlets (830) of the fuel cell stack.

12. The fuel cell system of claim 11, wherein:
the anode fluid comprises a fuel;
the cathode fluid comprises an oxidant; and
the coolant fluid comprises water.

13. The fuel cell system of claim 12, wherein:
the fuel comprises hydrogen gas; and
the oxidant comprises oxygen gas.

14. The fuel cell system of claim 12, wherein:
the oxidant comprises air.

15. The fuel cell system of claim 14, wherein the one or more of the anode fluid supply, the cathode fluid supply, and the coolant fluid supply comprise a pump configured to control the rate of the associated anode fluid delivery, cathode fluid delivery, and coolant fluid delivery into the fuel cell stack.

16. A method of forming a fuel cell unit, the method comprising:
forming a plurality of identical flow plates (300) each comprising a corrugated plate having cathode fluid flow channels (330) on a first face of the corrugated plate and anode fluid flow channels (315) across a second face of the corrugated plate;
wherein the cathode fluid flow channels (330) and anode fluid flow channels (315) are arranged to provide fluid flow from a flow plate inlet region (310) to a flow plate outlet region (320), and the flow plate further comprises one or more pairs of side seal regions (305);
forming a plurality of fluid manifold periphery plates (200/800);
wherein each fluid manifold periphery plate (200/800) comprises an inlet manifold portion (205) configured to engage with the flow plate inlet region (310), an outlet manifold portion (210) configured to engage with the flow plate outlet region (320), and one or more pairs of pass-through manifold portions (215) configured to engage with the one or more pairs of side seal regions (305);
forming a plurality of flow plate assemblies, each flow plate assembly comprising one of the identical flow plates disposed on one of the fluid manifold periphery plates and a membrane electrode assembly (400/401/402) disposed on the first face of the corrugated plate;
wherein the forming of each flow plate assembly comprises engaging the inlet manifold portion (205) with the flow plate inlet region (310), engaging the outlet manifold portion (210) with the flow plate outlet region (320), and engaging the one or more pairs of pass-through manifold portions (215) with the one or more pairs of side seal regions (305); and
forming the fuel cell unit by assembling a plurality of the formed flow plate assemblies into a stack configuration with adjacent flow plate assemblies disposed at an offset angle.

17. The method of forming a fuel cell unit of claim 16, wherein the forming of each flow plate assembly further comprises disposing an inter-cell sealing element (801) on a first surface of the fluid manifold periphery plate (200/800).

18. The method of forming a fuel cell unit of claim 17, wherein the forming of each flow plate assembly further comprises retaining the inter-cell sealing element (801) of each flow plate assembly within a sealing retention feature (802) formed in the fluid manifold periphery plate (200/800).

19. The method of forming a fuel cell unit of claim 16, wherein:
each flow plate is formed as a square flow field having one pair of side seal regions (305);
each fluid manifold periphery plate (200/800) is formed with one pair of pass-through manifold portions (215);
the offset angle is 36°; and
the fuel cell unit is formed by assembling two flow plate assemblies into a stack configuration.

20. The method of forming a fuel cell unit of claim 16, wherein:
each flow plate is formed as a hexagonal flow field having two pairs of side seal regions (305);
each fluid manifold periphery plate (200/800) is formed with two pairs of pass-through manifold portions (215);
the offset angle is 60°; and
the fuel cell unit is formed by assembling three flow plate assemblies into a stack configuration.

21. The method of forming a fuel cell unit of claim 16, wherein:
each flow plate is formed as an octagonal flow field having three pairs of side seal regions (305);
each fluid manifold periphery plate (200/800) is formed with three pairs of pass-through manifold portions (215);
the offset angle is 45°; and
the fuel cell unit is formed by assembling four flow plate assemblies into a stack configuration.

22. The method of forming a fuel cell unit of claim 16, wherein:
each flow plate is formed as a decagonal flow field having four pairs of side seal regions (305);
each fluid manifold periphery plate (200/800) is formed with four pairs of pass-through manifold portions (215);
the offset angle is 36°; and
the fuel cell unit is formed by assembling five flow plate assemblies into a stack configuration.

23. A method of forming a fuel cell stack, the method comprising:
aligning a plurality of identical fuel cell units formed according to claim 16, with each identical fuel cell unit aligned with an adjacent fuel cell unit with no offset angle.

24. A method of forming a fuel cell system, the method comprising:
a) forming a fuel cell stack according to the method of claim 23, wherein, for each fuel cell unit:

the inlet manifold portion (205) of each fluid manifold periphery plate (200/800) comprises a plurality of anode inlets (810), a plurality of cathode inlets (820), and a coolant inlet (830);

the outlet manifold portion (210) of each fluid manifold periphery plate (200/800) comprises a plurality of anode outlets (811) and a plurality of cathode outlets (821);

the plurality of anode inlets (810), the coolant inlet (830), and the plurality of anode outlets (811) are fluidly connected to the anode flow channels (315) of an associated flow plate (300); and the plurality of cathode inlets (820) and the plurality of cathode outlets (821) are fluidly connected to the cathode flow channels (330) of an associated flow plate (300);

b) fluidly connecting an anode fluid supply containing anode fluid to the anode inlets (810) of the fuel cell stack;

c) fluidly connecting a cathode fluid supply containing cathode fluid to the cathode inlets (820) of the fuel cell stack; and d) fluidly connecting a coolant fluid supply containing coolant fluid to the coolant inlets (830) of the fuel cell stack.

* * * * *